US012695208B2

(12) United States Patent
Tang et al.

(10) Patent No.: US 12,695,208 B2
(45) Date of Patent: Jul. 28, 2026

(54) MICROELECTRONIC DEVICE PACKAGE WITH INTEGRAL SLOTTED WAVEGUIDE ANTENNA

(71) Applicant: Texas Instruments Incorporated, Dallas, TX (US)

(72) Inventors: Yiqi Tang, Allen, TX (US); Rajen Murugan, Dallas, TX (US); Harshpreet Singh Phull Bakshi, Dallas, TX (US); Sylvester Ankamah-Kusi, Dallas, TX (US); Juan Herbsommer, Allen, TX (US); Aditya Nitin Jogalekar, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 237 days.

(21) Appl. No.: 18/309,720

(22) Filed: Apr. 28, 2023

(65) Prior Publication Data

US 2023/0352850 A1 Nov. 2, 2023

Related U.S. Application Data

(63) Continuation-in-part of application No. 17/733,921, filed on Apr. 29, 2022.

(51) Int. Cl.
*H01Q 1/22* (2006.01)
*H01Q 21/00* (2006.01)

(52) U.S. Cl.
CPC ......... *H01Q 21/005* (2013.01); *H01Q 1/2283* (2013.01)

(58) Field of Classification Search
CPC .......... H01Q 1/22; H01Q 1/2283; H01Q 1/40; H01Q 21/00; H01Q 21/0043; H01Q 21/005; H01P 11/00; H01P 11/002
See application file for complete search history.

(56) References Cited

U.S. PATENT DOCUMENTS

| | | | | |
|---|---|---|---|---|
| 9,647,329 | B2 * | 5/2017 | Herbsommer | H01L 23/49517 |
| 10,852,495 | B2 * | 12/2020 | Liff | G02B 6/4249 |
| 10,886,606 | B2 * | 1/2021 | Kamgaing | H01L 23/66 |
| 11,050,155 | B2 * | 6/2021 | Eid | H01L 23/3107 |
| 11,735,806 | B2 * | 8/2023 | Gupta | H01Q 21/0006 343/905 |
| 12,074,124 | B2 * | 8/2024 | Zanati | H01L 23/49811 |

OTHER PUBLICATIONS

R. Elliott and L. Kurtz, "The design of small slot arrays," IEEE Transactions on Antennas and Propagation, vol. 26, No. 2, pp. 214-219, Mar. 1978.

* cited by examiner

*Primary Examiner* — Tho G Phan
(74) *Attorney, Agent, or Firm* — Xiaotun Qiu; Frank D. Cimino

(57) ABSTRACT

An example microelectronic device package includes: a multilayer package substrate including a slotted waveguide antenna and having routing conductors, the multilayer package substrate having a device side surface and an opposing board side surface; a semiconductor die mounted to the device side surface of the multilayer package substrate and coupled to slotted waveguide antenna by the routing conductors; and mold compound covering the semiconductor die, and a portion of the multilayer package substrate.

26 Claims, 20 Drawing Sheets

MICROELECTRONIC DEVICE PACKAGE WITH INTEGRAL SLOTTED WAVEGUIDE ANTENNA

CROSS-REFERENCE TO RELATED APPLICATIONS

This application is a continuation-in-part of and claims the benefit of and priority to U.S. patent application Ser. No. 17/733,921, filed Apr. 29, 2022, which Application is hereby incorporated herein by reference in its entirety.

TECHNICAL FIELD

This relates generally to microelectronic device packages, and more particularly to microelectronic device packages including one or more integral antennas and, some examples, one or more semiconductor devices.

BACKGROUND

Processes for producing microelectronic device packages include mounting a semiconductor die to a package substrate and covering the electronic devices with a dielectric material such as a mold compound to form packaged devices.

Incorporating antennas with semiconductor devices in a microelectronic device package is desirable. Antennas are increasingly used with microelectronic devices and portable devices, such as communications systems, communications devices including 4G, 5G or LTE capable cellphones, tablets, and smartphones. Additional applications include microelectronic devices in automotive systems such as radar, navigation and over the air communications systems. Autonomous vehicles and robots, and factory automation, can use the devices for navigation, accident avoidance, and control. Frequencies used can include millimeter wave and other GHz frequencies, as well as other frequencies. Systems using antennas with packaged semiconductor devices often place the antennas on a high-performance substrate such as those used for a printed circuit board, an organic substrate or other low dielectric substrate. A semiconductor device can be mounted to the high-performance substrate, near the antennas. These approaches often employ expensive printed circuit board (PCB) substrates, which are sometimes used inside a molded package with mold compound covering the semiconductor devices. These solutions are relatively high in cost and require substantial device area. Forming microelectronic device packages including efficient and cost-effective antennas within the microelectronic device packages remains challenging.

SUMMARY

In a described example, a microelectronic device package includes: a multilayer package substrate comprising a slotted waveguide antenna and having routing conductors, the multilayer package substrate having a device side surface and an opposing board side surface; a semiconductor die mounted to the device side surface of the multilayer package substrate and coupled to the slotted waveguide antenna by the routing conductors; and mold compound covering the semiconductor die, and a portion of the multilayer package substrate or the entire package substrate.

In a further described example, a method includes: forming a the multilayer package substrate comprising a slotted waveguide antenna and routing connections in trace level conductors of the multilayer package substrate; mounting a semiconductor die over a device side surface of the multilayer package substrate, the semiconductor die coupled to the slotted waveguide antenna by the routing conductors; and covering the semiconductor die and a portion of the board side surface of the package substrate with mold compound to form a microelectronic device package.

DETAILED DESCRIPTION

Figure 1A:
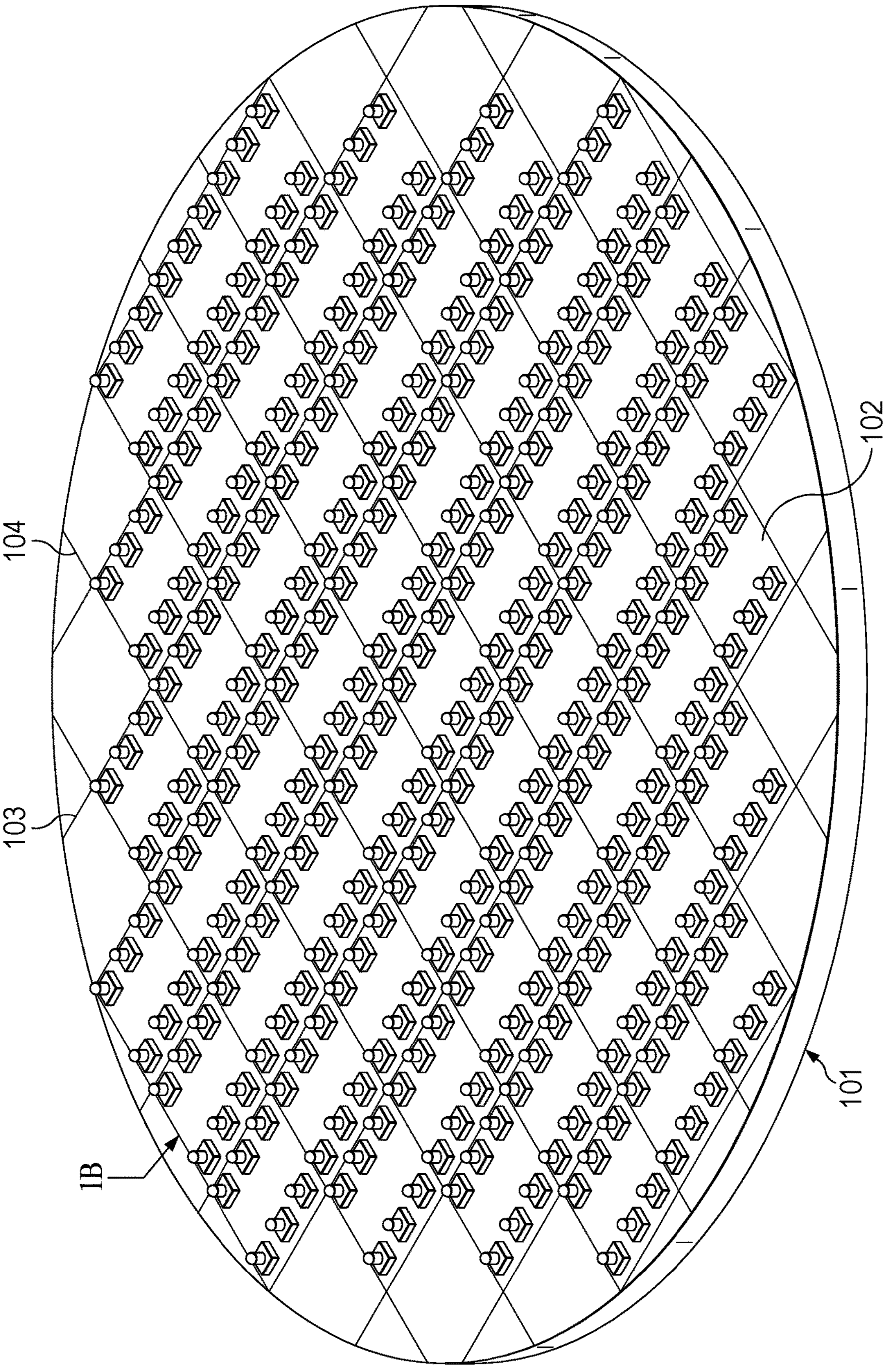
FIGS. 1A-1B illustrate, in a projection view and a close-up projection view, respectively, semiconductor dies on a semiconductor wafer and an individual semiconductor die from the semiconductor wafer, for use with the arrangements.

Corresponding numerals and symbols in the different figures generally refer to corresponding parts, unless otherwise indicated. The figures are not necessarily drawn to scale.

Elements are described herein as "coupled." The term "coupled" includes elements that are directly connected and elements that are indirectly connected, and elements that are electrically connected even with intervening elements or wires are coupled.

The term "semiconductor device" is used herein. A semiconductor device can be a discrete semiconductor device such as a bipolar transistor, a few discrete devices such as a pair of power FET switches fabricated together on a single semiconductor die, or a semiconductor device can be an integrated circuit with multiple semiconductor devices such as the multiple capacitors in an A/D converter. The semiconductor device can include passive devices such as resistors, inductors, filters, sensors, or active devices such as transistors. The semiconductor device can be an integrated circuit with hundreds or thousands of transistors coupled to form a functional circuit, for example a microprocessor or memory device. The semiconductor device can be a radio transceiver or a radar transceiver. The semiconductor device can be a receiver or a transmitter. When semiconductor devices are fabricated on a semiconductor wafer and then individually separated from the semiconductor wafer, the individual units are referred to as "semiconductor dies". A semiconductor die is also a semiconductor device.

The term "microelectronic device package" is used herein. A microelectronic device package has at least one semiconductor die electrically coupled to terminals, and has a package body that protects and covers the semiconductor die. The microelectronic device package can include additional elements, in some arrangements an integrated antenna is included. Passive components such as capacitors, resistors, and inductors or coils can be included. In some arrangements, multiple semiconductor dies can be packaged together. The semiconductor die is mounted to a package substrate that provides conductive leads, a portion of the conductive leads form the terminals for the packaged device. The semiconductor die can be mounted to the package substrate with a device side surface facing away from the substrate and a backside surface facing and mounted to a die pad of the package substrate. In wire bonded semiconductor device packages, bond wires couple conductive leads of a package substrate to bond pads on the semiconductor die. Alternatively, the semiconductor die can be mounted with a device side facing towards the package substrate using conductive post connects in a flip chip package. The microelectronic device package can have a package body formed by a thermoset epoxy resin in a molding process, or by the use of epoxy, plastics, or resins that are liquid at room temperature and are subsequently cured. The package body may provide a hermetic package for the packaged device. The package body may be formed in a mold using an encapsulation process, however, a portion of the leads of the package substrate are not covered during encapsulation, these exposed lead portions provide the terminals for the microelectronic device package.

The term "package substrate" is used herein. A package substrate is a substrate arranged to receive a semiconductor die and to support the semiconductor die in a completed semiconductor device package. Package substrates useful with the arrangements include conductive lead frames, molded interconnect substrates (MIS), partially etched lead frames, pre-molded lead frames, and multilayer package substrates. In some arrangements, a flip chip die mount is used, where post connects that extend from bond pads on the semiconductor device are attached by a solder joint to conductive lands on the device side surface of the package substrate. The post connects can be solder bumps or other conductive materials such as copper or gold with solder on a distal end. Copper pillar bumps can be used. In alternative arrangements using wire bonded packages, bond wires can couple bond pads on the semiconductor dies to the leads on the device side surface of the package substrate.

The term "multilayer package substrate" is used herein. A multilayer package substrate is a substrate that has multiple trace conductor layers including conductor trace levels, and which has connection level conductors extending through the dielectric material between the trace conductor levels. In an example arrangement, a multilayer package substrate is formed in an additive manufacturing process by plating a patterned trace conductor level and then covering the trace conductor level with a layer of dielectric material. Grinding or thinning can be performed on the dielectric material to expose portions of the top surface of the layer of conductors from the dielectric material. Additional plating layers can be formed to add additional levels of trace level conductors, some of which are trace layers that are coupled to other trace layers in the dielectric materials by connection level conductors, and additional dielectric material can be deposited at each trace layer level and can cover the conductors. By using an additive or build-up manufacturing approach, and by performing multiple plating steps, multiple dielectric formation steps, and multiple grinding steps, a multilayer package substrate is formed with an arbitrary number of trace level conductor layers and connection level conductor layers between and coupling portions of the trace level conductor layers.

In an example arrangement, copper, gold or tungsten conductors are formed by plating, and a thermoplastic material can be used as the dielectric material. The connector level conductors between trace level conductor layers can be of arbitrary shapes and sizes and can include rails and pads to couple trace layers with low resistance for power and high current signals. Unlike vias in a printed circuit board technology, the connection level conductors extending through the dielectric material are not formed by plating conductors in holes mechanically drilled through a dielectric material, which are limited in size and shape. Instead, in the arrangements, an additive build-up approach forms the connection level conductors plated during the additive manufacturing process, and thus the connection level conductors can have a variety of shapes and sizes.

In packaging microelectronic and semiconductor devices, mold compound may be used to partially cover a package substrate, to cover components, to cover a semiconductor die, and to cover the electrical connections from the semiconductor die to the package substrate. This molding process can be referred to as an "encapsulation" process, although some portions of the package substrates are not covered in the mold compound during encapsulation, for example terminals and leads are exposed from the mold compound to enable electrical connections to the packaged device. Encapsulation is often a compressive molding process, where thermoset mold compound such as resin epoxy can be used. A room temperature solid or powdered mold compound can be heated to a liquid state and then molding can be performed by pressing the liquid mold compound into a mold through runners or channels. Transfer molding can be used. Unit molds shaped to surround an individual device may be used, or block molding may be used, to form multiple packages simultaneously for several devices from mold compound. The devices to be molded can be provided in an array or matrix of several, hundreds or even thousands of devices in rows and columns that are then molded together.

After the molding process is complete, the individual microelectronic device packages are cut apart from each other in a sawing operation by cutting through the mold compound and package substrate in saw streets formed between the devices. Portions of the package substrate leads are exposed from the mold compound package to form terminals for the packaged semiconductor device.

The term "scribe lane" is used herein. A scribe lane is a portion of semiconductor wafer between semiconductor dies. Sometimes in related literature the term "scribe street"

is used. Once semiconductor processing is finished and the semiconductor devices are complete, the semiconductor devices are separated into individual semiconductor dies by severing the semiconductor wafer along the scribe lanes. The separated dies can then be removed and handled individually for further processing. This process of removing dies from a wafer is referred to as "singulation" or sometimes referred to as "dicing." Scribe lanes are arranged on four sides of semiconductor dies and when the dies are singulated from one another, rectangular semiconductor dies are formed.

The term "saw street" is used herein. A saw street is an area between molded electronic devices used to allow a saw, such as a mechanical blade, laser, or other cutting tool to pass between the molded electronic devices to separate the devices from one another. This process is another form of singulation. When the molded electronic devices are provided in a strip with one device adjacent to another device along the strip, the saw streets are parallel and normal to the length of the strip. When the molded electronic devices are provided in an array of devices in rows and columns, the saw streets include two groups of parallel saw streets, the two groups are normal to each other, and the saw will traverse the molded electronic devices in two different directions to cut apart the packaged electronic devices from one another in the array.

The term "quad flat no-lead" (QFN) is used herein for a type of electronic device package. A QFN package has conductive leads that are coextensive with the sides of a molded package body, and in a quad package the leads are on four sides. Alternative flat no-lead packages may have leads on two sides or only on one side. These can be referred to as small outline no-lead or SON packages. No-lead packaged electronic devices can be surface mounted to a board. Leaded packages can be used with the arrangements where the leads extend away from the package body and are shaped to form a portion for soldering to a board. A dual in line package (DIP) can be used with the arrangements. A small outline package (SOP) can be used with the arrangements. Small outline no-lead (SON) packages can be used, and a small outline transistor (SOT) package is a leaded package that can be used with the arrangements. Leads for leaded packages are arranged for solder mounting to a board. The leads can be shaped to extend towards the board and form a mounting surface. Gull wing leads, J-leads, and other lead shapes can be used. In a DIP package, the leads end in pin shaped portions that can be inserted into conductive holes formed in a circuit board, and solder is used to couple the leads to the conductors within the holes.

The term "antenna" is used herein. As used herein, an antenna is a structure arranged to transmit or receive signals, such as radio signals or radar signals. The term "slotted waveguide antenna" is used. A slotted waveguide antenna has a rectangular waveguide for guiding the RF radiation, and slots in one surface of the rectangular waveguide act as an antenna. In the arrangements, a slotted waveguide antenna, or arrays of slotted waveguide antennas, are formed integral to a package substrate, such as a multilayer package substrate.

In the arrangements, a microelectronic device package includes at least one slotted waveguide antenna. In some examples, a semiconductor die such a radio frequency (RF) transceiver device can be mounted to a package substrate that includes an integral slotted waveguide antenna, the semiconductor die can then transceive RF signals using the slotted waveguide antenna. In an example arrangement, the slotted waveguide antennas are designed for a particular frequency and application, such as millimeter wave signals. In example arrangements, the slotted waveguide antenna can be formed in a two-level multilayer package substrate, a three or more-layer multilayer package substrate or a laminate package substrate, and the multilayer package substrate can be used to mount the semiconductor die and to couple the semiconductor die to the antenna using coplanar waveguides, microstrip, or in a particular example a conductor backed coplanar waveguide (CBCPW). The package substrate can include conductors that form routing connections between the semiconductor die, the slotted waveguide antenna, and terminals of the microelectronic device package formed on a board side surface of the package substrate. Use of the multilayer package substrate to form the slotted waveguide antenna and to mount the semiconductor die allows for a less expensive microelectronic device package with an integral antenna (when compared to discrete laminates used in prior approaches), reduces costs, and can reduce the overall size of the microelectronic device package (compared to discrete antennas mounted in microelectronic device packages without the use of the arrangements).

In some example arrangements, the multilayer package substrate has a device side surface, a semiconductor die mounted on a portion of the device side surface, and a slotted waveguide antenna or an array of the slotted waveguide antennas formed in the multilayer package substrate and spaced from the semiconductor die. The slotted waveguide antennas can include slots in an upper surface formed as radiators. In an example the slotted waveguide antennas include slotted conductors in a top layer of a rectangular waveguide. The rectangular waveguide is filled with dielectric material. In an arrangement the dielectric material is the same dielectric material used between the conductor levels in the multilayer package substrate, and the rectangular waveguide has sides, a bottom surface and top surface formed of the conductors of the multilayer package substrate. A semiconductor die mounted to the device side surface of the package substrate can be coupled to the slotted waveguide antenna or antennas by conductive traces formed in trace layers of the package substrate. In one example, the semiconductor die can be flip chip mounted to a device side surface of a multilayer package substrate. In another example, the semiconductor die can be mounted to the multilayer package substrate and coupled to traces on the multilayer package substrate using wire bonds. In some arrangements, the semiconductor die and the antenna in the multilayer package substrate can be completely covered by mold compound or another encapsulation material such as an epoxy or resin. In another arrangement, a protective lid or cover can be mounted over the semiconductor die and the device side surface of the multilayer package substrate to complete the microelectronic device package.

In an example arrangement, a slotted waveguide antenna in the microelectronic device package is arranged to operate in the millimeter wave frequency range, between 30 GHz and 300 GHz, with signals having wavelengths in air between 10 millimeters and 1 millimeter. Other frequency signals such as RF signals can be transmitted or received by the antennas. In a described example, the slotted waveguide antenna is arranged for signals at 207-212 GHz, in the WR5 or "G band" frequency band (which ranges from 140-220 GHz).

The semiconductor die device used in the arrangements can be a monolithic millimeter wave integrated circuit (MMIC). The MMIC can be a transmitter, receiver, transceiver, or a component in a system for transmitting or receiving signals. The semiconductor die can be provided as multiple semiconductor dies or as a single semiconductor die. Additional components such as passives or filters can be mounted to the multilayer package substrate, to form a radio frequency system. Additional passive components can be formed in the multilayer package substrate using the conductors and dielectric material, for example capacitors can be formed. Millimeter wave transition devices can be formed to couple the RF signals to the slotted waveguide antenna. Microstrip and coplanar waveguides can be formed in the multilayer package substrate to couple the semiconductor die to the slotted waveguide antenna or antennas.

Figure 1B:
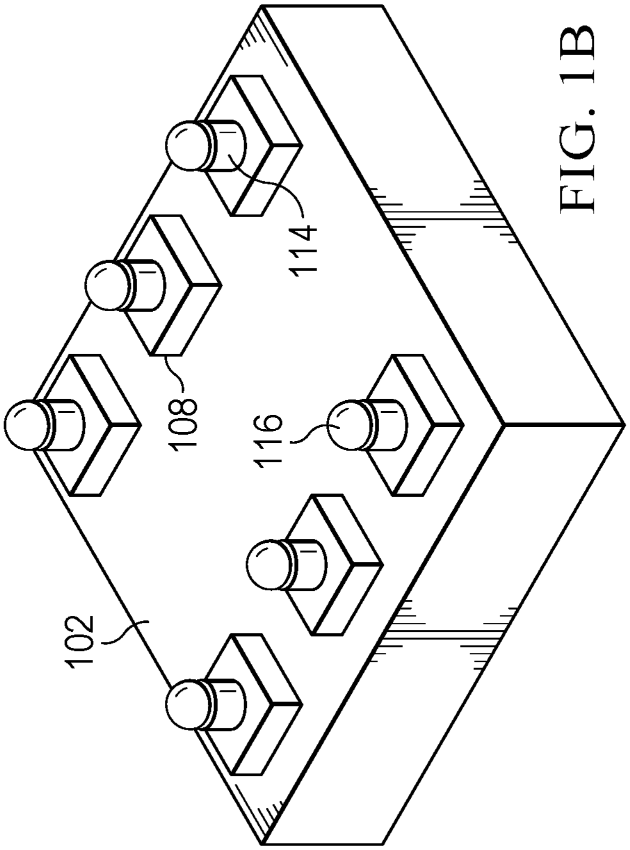

FIGS. 1A and 1B illustrate, in two projection views, a semiconductor wafer having semiconductor die devices formed on it and configured for flip chip mounting, and an individual semiconductor die for flip-chip mounting, respectively. In FIG. 1A, a semiconductor wafer 101 is shown with an array of semiconductor dies 102 formed in rows and columns on a surface. The semiconductor dies 102 can be formed using processes in a semiconductor manufacturing facility, including ion implantation, doping, anneals, oxidation, dielectric and metal deposition, photolithography, pattern, etch, chemical mechanical polishing (CMP), electroplating, and other processes for making semiconductor devices. Scribe lanes 103 and 104, which are perpendicular to one another, and which run in parallel groups across the wafer 101, separate the rows and columns of the completed semiconductor dies 102, and provide areas for dicing the wafer 101 to separate the semiconductor dies 102 from one another.

FIG. 1B illustrates a single semiconductor die 102 taken from semiconductor wafer 101. Semiconductor die 102 includes bond pads 108, which are conductive pads that are electrically coupled to devices (not shown) formed in the semiconductor die 102. Conductive post connects 114 are shown extending away from a proximate end on the bond pads 108 on the surface of semiconductor die 102 to a distal end, and solder bumps 116 are formed on the distal ends of the conductive post connects 114. The conductive post connects 114 can be formed by electroless plating or electroplating. In an example, the conductive post connects 114 are copper, and have solder bumps 116 on the distal ends, and are sometimes referred to as "copper pillar bumps." Copper pillar bumps can be formed by sputtering a seed layer over the surface of the semiconductor wafer 101, forming a photoresist layer over the seed layer, using photolithography to expose seed layer over the bond pads 108 in openings in the layer of photoresist, plating the copper conductive post connects 114 on the bond pads, and plating a lead solder or a lead-free solder such as an tin, silver (SnAg) or tin, silver, copper (SnAgCu) or SAC solder to form solder bumps 116 on the copper conductive post connects 114. In an alternative approach, solder bumps or particles may be dropped onto the distal ends of the copper pillar bumps and then reflowed in a thermal process to form bumps. Other conductive materials can be used for the conductive post connects in an electroplating or electroless plating operation, including gold, silver, nickel, palladium, or tin, for example. Not shown for clarity of illustration are under bump metallization (UBM) portions which can be formed over the bond pads to improve plating and adhesion between the conductive post connects 114 and the bond pads 108. After the plating operations, the photoresist is then stripped, and the excess seed layer is etched from the surface of the wafer. Polyimide (PI) (not shown) or other dielectric can be applied between the conductive post connects to protect the semiconductor die 102 and the conductive post connects 114. The semiconductor dies 102 are then separated by dicing, or are singulated, using the scribe lanes 103, 104 (see FIG. 1A).

Figure 2A:
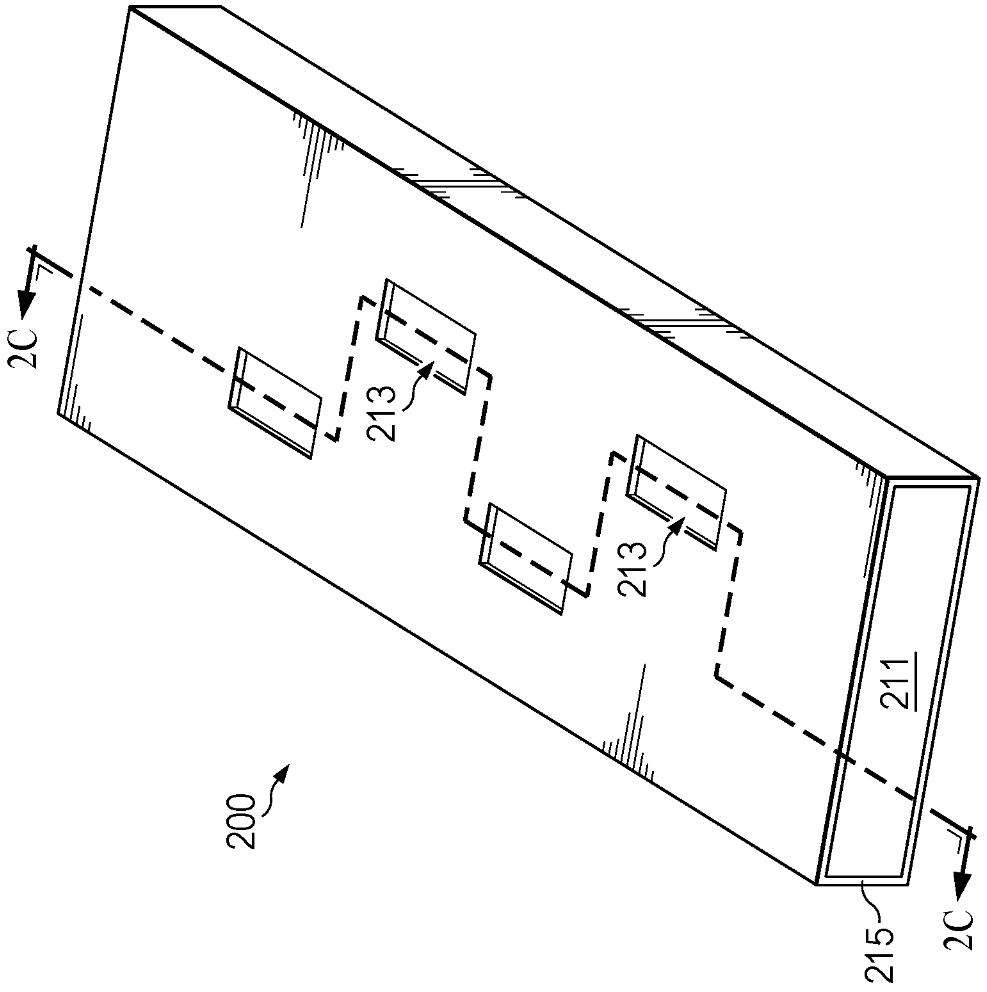
FIGS. 2A-2C illustrate, in projection views, a slotted waveguide antenna suitable for formation in a package substrate, a field strength diagram illustrating the split of electric field energy along the propagation path of the slotted waveguide antenna at a resonant frequency, and an illustration of the electric field strength emitted from the slotted waveguide antenna in an example microelectronic device package. cross sectional view, a multilayer package substrate for use with the arrangements.
Figure 2B:
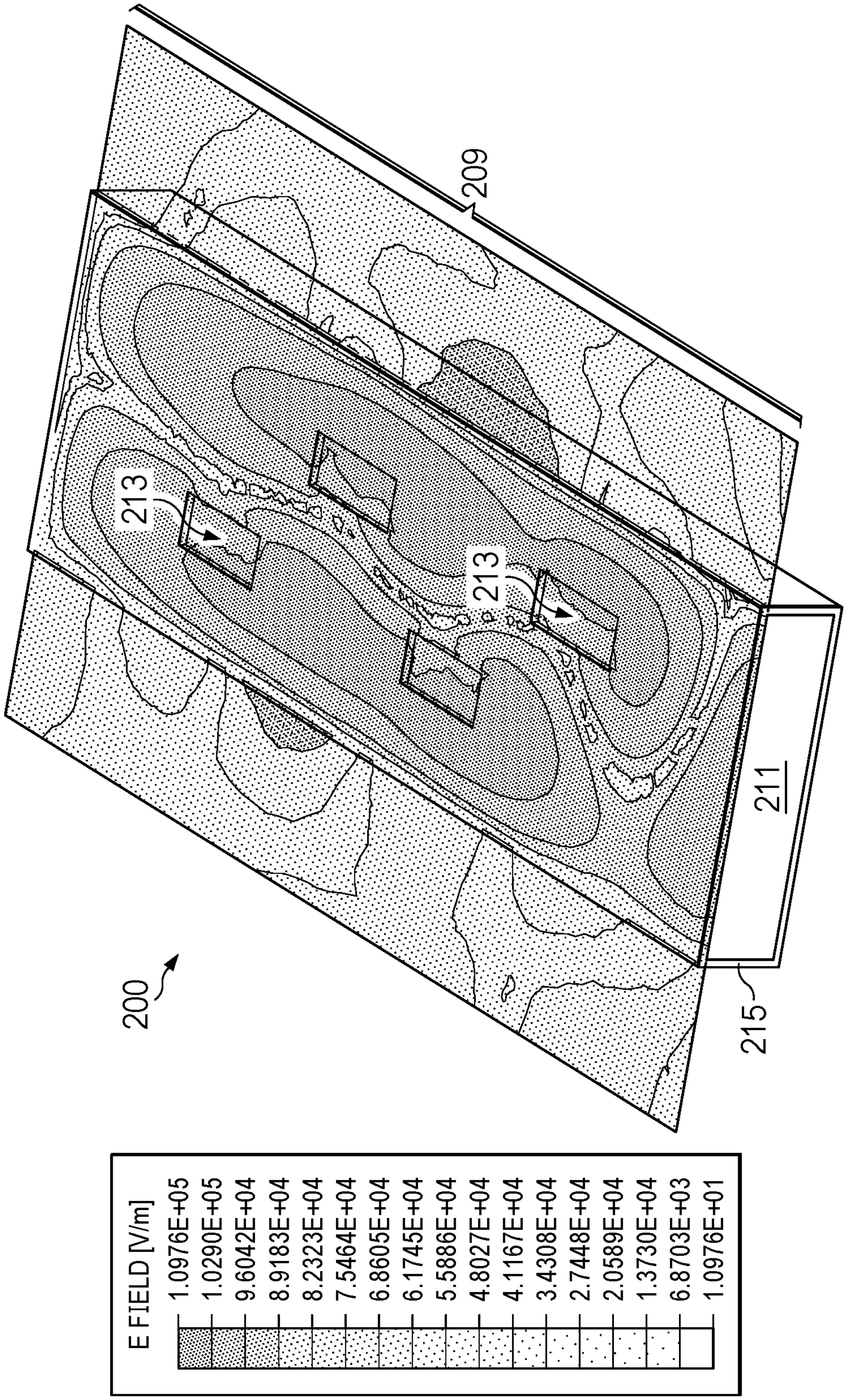
Figure 2C:
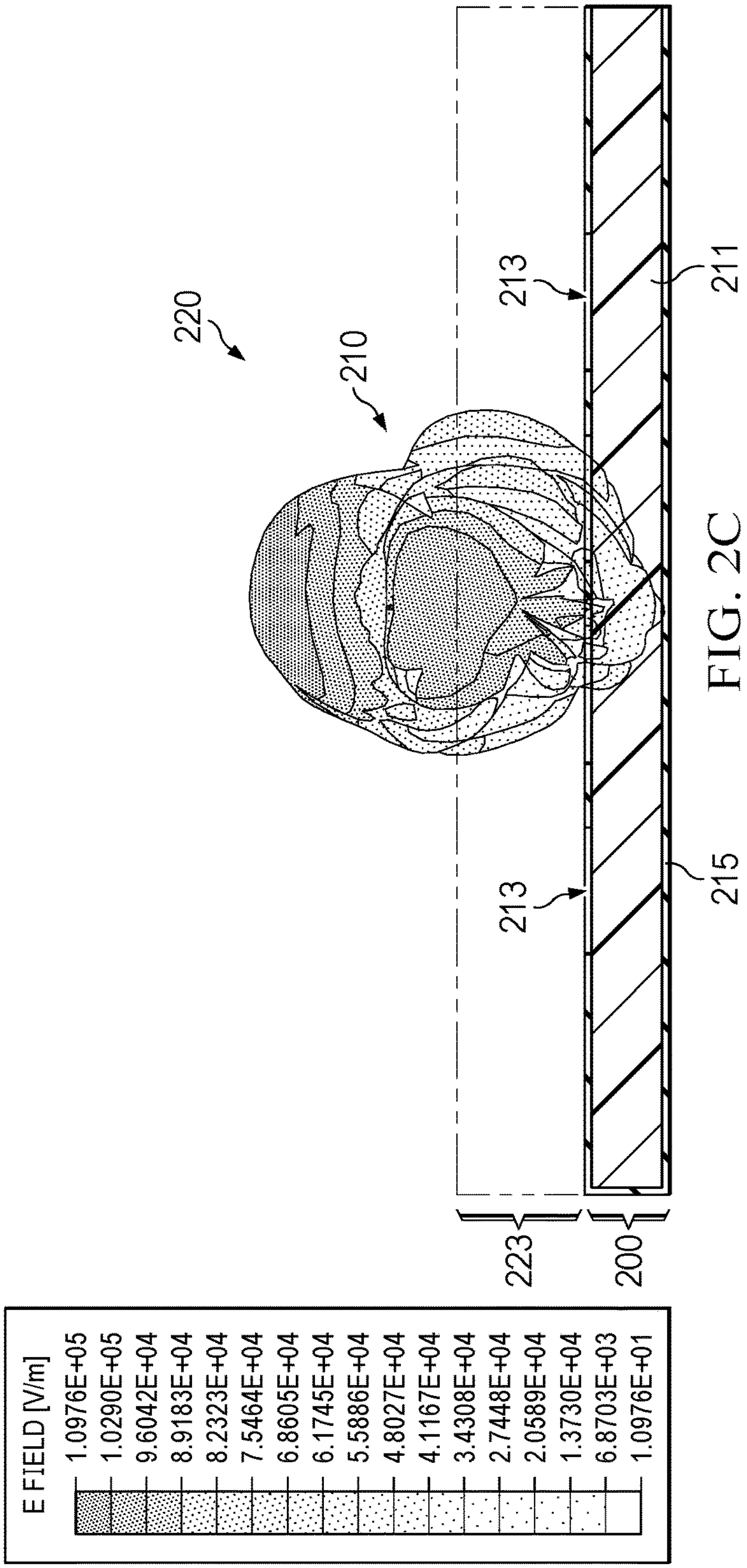

FIGS. 2A-2C illustrate, in projection views and a cross sectional view, respectively, a slotted waveguide antenna that can be used in an arrangement. In FIG. 2A, the slotted waveguide antenna 200 is shown in a projection view. Conductors 215 form a rectangular waveguide with slots 213 in the top conductor layer. A dielectric material 211 fills the slotted waveguide antenna 200. The slotted waveguide antenna 200 can be tuned to project a narrow band signal from the top surface (as the elements are oriented in FIGS. 2A-2C). The slotted waveguide antenna 200 can be tuned using the dimensions of the waveguide, and the size and positions of the slots, to resonate at a desired frequency and to radiate energy as an antenna at a desired frequency.

FIG. 2B illustrates in another projection view a signal spread graph 209 overlaid on the slotted waveguide antenna 200 of FIG. 2A. The slots 213 are tuned to spread the radio frequency energy over the surface of the antenna 200. The leaked energy from the left side slots and the right side slots is coupled to form a beam. The waveguide of the slotted waveguide antenna 200 is designed to propagate radio frequency energy along its length in a $TE_{10}$ propagation mode. The dielectric 211, in the example arrangements, is the dielectric material used to form a multilayer package substrate. In the example arrangements, the conductors 215 are trace level conductors, and connection level conductors used to form the multilayer package substrate. The conductors 215 can be plated copper or copper alloy, gold or gold alloy, or other plated conductors and alloys.

FIG. 2C illustrates in a cross sectional view an example microelectronic device package 220 including the slotted waveguide antenna. Mold compound 223 is shown covering the slotted waveguide antenna 200, with the dielectric 211 filling the rectangular waveguide formed by conductors 215. Slots 213 are shown in the upper surface (as the elements are oriented in FIG. 2C) of the slotted waveguide antenna 200. The cross section in FIG. 2C shows an example radiation pattern plot 210 in Volts/meter with the signal radiating from the microelectronic device package 220. The slotted waveguide antenna 200 can be tuned to a particular frequency to efficiently radiate the signals in a narrow frequency band, with a narrow beamwidth, and high antenna gain. In an example the slotted waveguide antenna 200 is terminated at approximately half the wavelength for a desired frequency, and the slots 213 are tuned to be a little over one quarter of the wavelength, so that the impedance looking into the slots is matched to the target frequency. Designing the slots and determining the slot length is described in R. Elliott and L. Kurtz, "The design of small slot arrays," *IEEE Transactions on Antennas and Propagation*, Vol. 26, No. 2, pp. 214-219, March 1978 (hereinafter "Elliott and Kurtz"); which is hereby incorporated by reference herein in its entirety.

Figure 3:
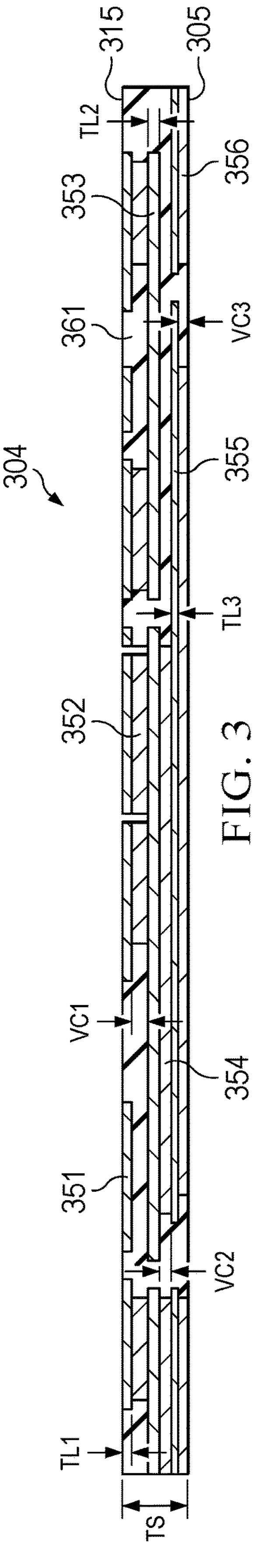
FIG. 3 illustrates, in a cross-sectional view, the trace layers and via layers of a multilayer package substrate that can be used with the arrangements.

FIG. 3 illustrates in a cross-sectional view a multilayer package substrate 304 that can be used with the arrangements. In FIG. 3, the multilayer package substrate 304 has a device side surface 315 and a board side surface 305. Three trace level conductor layers 351, 353, 355 are formed spaced from one another by dielectric material 361, the trace level conductor layers are patterned for making horizontal connections, and three connection level conductor layers 352, 354, 356 form connections between the three trace level conductor layers 351, 353, 355 and extend through the dielectric material 361 that is disposed over and between the trace level conductor layers. The dielectric material 361 can be a thermoplastic material such as Ajinomoto build-up film (ABF), acrylonitrile butadiene styrene (ABS), acrylonitrile styrene acrylate (ASA), or epoxy resin, such as epoxy resin mold compound. Electronic mold compound (EMC) is an example thermoset epoxy resin mold compound. Ajinomoto build-up film is commercially available from Ajinomoto Co., Inc., 15-1 Kyobashi 1-chome, Tokyo, Japan 104-8315.

In one example the multilayer package substrate 304 has a substrate thickness labeled "TS" of about 205 microns. In this example, the first trace level conductor layer, 351, is near or at the device side surface 315 of the multilayer package substrate, and has a first trace level conductor layer thickness TL1 of 15 microns. The first connection level conductor layer, 352, has a thickness VC1 of 25 microns. The second trace level conductor layer, 353, sometimes coupled to the first trace level conductor layer by the first connection level conductor layer 352, has a thickness labeled TL2 of 60 microns. The second connection level conductor layer, 354, has a thickness labeled VC2 of 65 microns. The third trace level conductor layer, 355, has a thickness labeled TL3 of 15 microns, and the third connection level conductor layer, 356, has a thickness labeled VC3 of 25 microns. Additional layers, such as conductive lands on the device side surface 315, or conductive terminals on the board side surface 305, may be formed by additional plating (not shown in FIG. 3). When the multilayer package substrate 304 is formed, a continuous connection between the device side surface 315 and the board side surface 305 can be formed by patterning a stack of trace level conductor layers and by patterning the corresponding connection level conductor layers to form a continuous path extending through the dielectric material 361.

In the arrangements, connection level conductor layers and portions of the trace level conductor layers form the opposing sides of one or more rectangular waveguides, while trace level conductor layers form a board side and a device side surface of the rectangular waveguides, and the dielectric material such as ABF fill the rectangular waveguides. Slots etched into the top surface of the rectangular waveguides, the device side conductor, form slotted waveguide antennas using the rectangular waveguides.

Note that in this description, the connection level conductor layers 352, 354, and 356 are not described as "vias." This is done to distinguish the connection level conductor layers of the arrangements from vertical connections of PCBs or other circuit board substrates, where vias are filled or plated holes. The connection level conductor layers of the multilayer package substrates can be formed using additive manufacturing, while vias in PCBs are usually formed by removing material, for example via holes are drilled into a substrate. In PCBs, these via holes between conductor layers then must be plated and then filled with a conductor, which uses additional plating steps after the drilling steps. These additional steps for PCB vias are precise manufacturing processes that add costs and require additional manufacturing tools and capabilities.

In contrast to PCB manufacture, the connection level conductor layers used in the multilayer package substrates of the arrangements are formed in build-up plating processes similar to the processes used in forming the trace level conductor layers, simplifying manufacture, and reducing costs. In addition, the connection level conductor layers in the arrangements can be arbitrary shapes, such as rails, columns, or posts, and the rails can be formed in continuous patterns to form electric shields, tubs, or tanks, and can be coupled to grounds or other potentials, isolating regions of the multilayer package substrate from one another. Noise reduction and the ability to create electrically isolated portions of the multilayer package substrate can be enhanced by use of the connection level conductors to form tanks, shields, and tubs. Thermal performance of the microelectronic device packages of example arrangements can be improved by use of the connection level conductor layers to form thermally conductive columns, sinks or rails that can be coupled to thermal paths on a system board to increase thermal dissipation from the semiconductor devices mounted on the multilayer package substrate. In the arrangements, rectangular waveguides are formed using the trace level conductor layers and the connection level conductor layers patterned to form top and bottom surfaces, and opposing sides, of the rectangular waveguides.

Figure 4A:
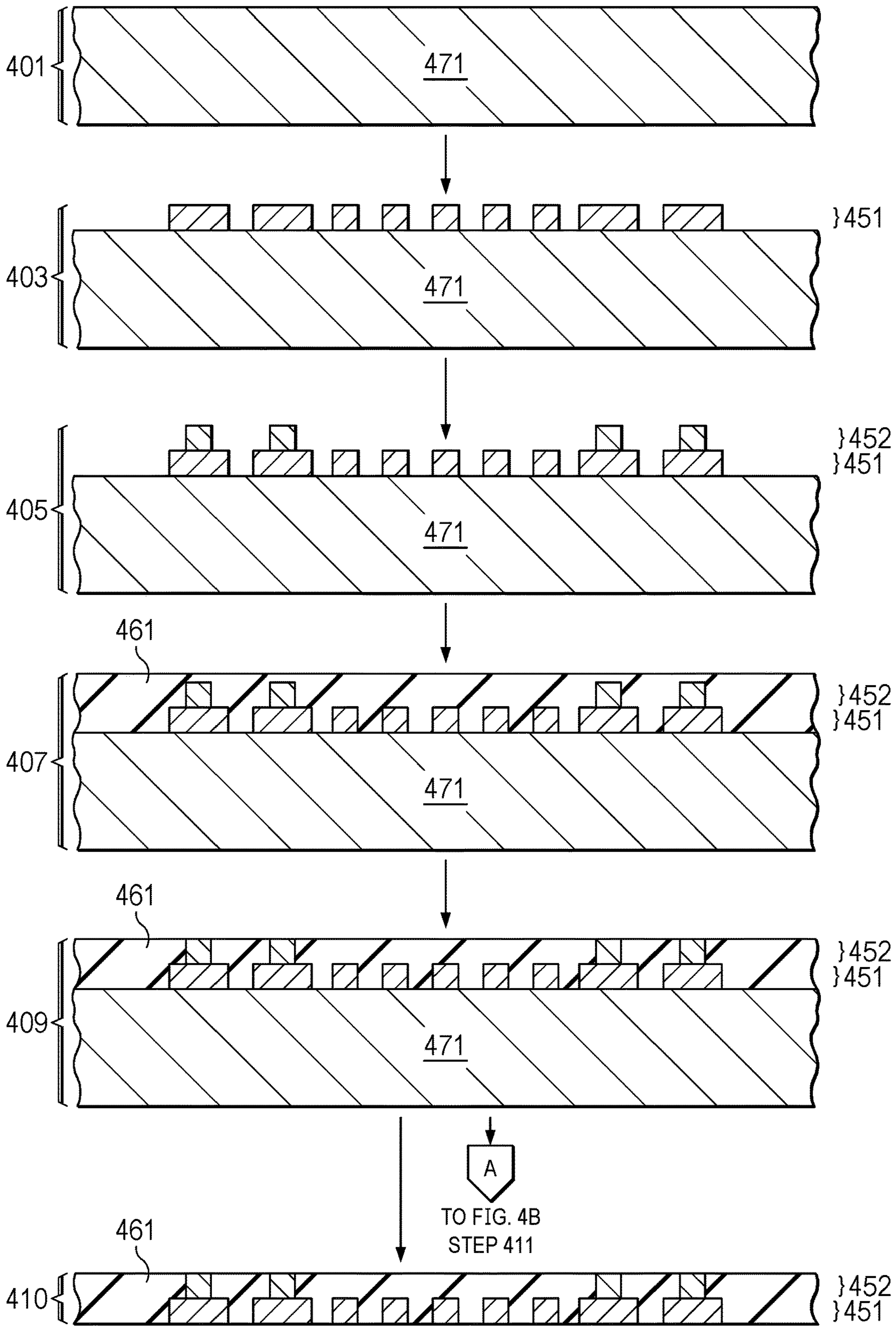
FIGS. 4A-4B illustrate, in a series of cross-sectional views, the major steps in manufacturing a multilayer package substrate that can be used in the arrangements.
Figure 4B:
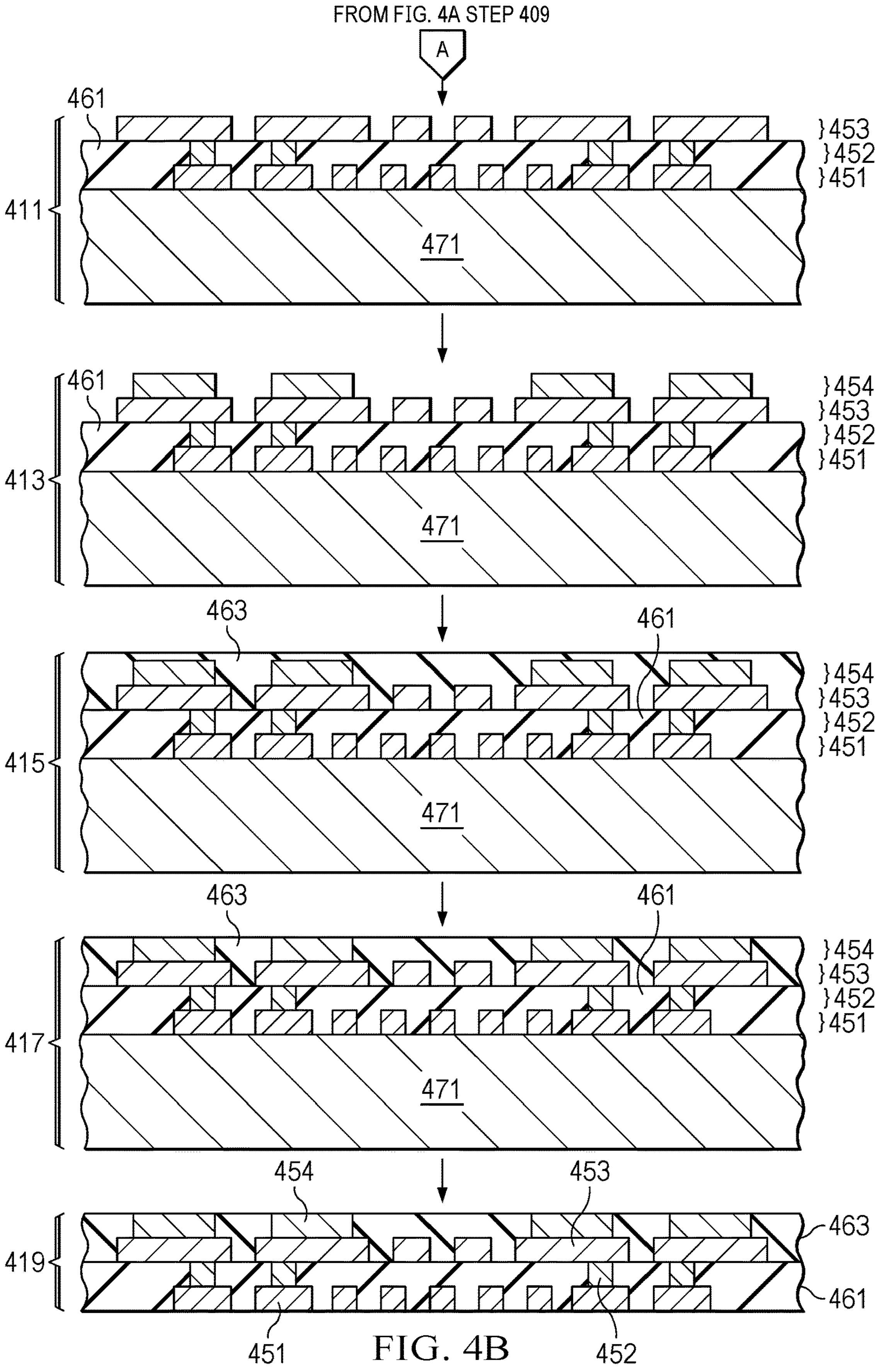

FIGS. 4A-4B illustrate, in a series of cross sectional views, selected steps for a method for forming a multilayer package substrate such as the multilayer package substrate 304 in FIG. 3 that is useful with the arrangements. In FIG. 4A, at step 401, a metal, semiconductor or glass carrier 471 is readied for a plating process. The carrier 471 can be stainless steel, steel, aluminum or another metal or can be a silicon wafer or a glass that will support the multilayer package substrate layers during plating and molding steps, the multilayer package substrate is then removed, and the carrier 471 can be discarded or can be cleaned for use in additional manufacturing processes.

At step 403, a first trace level conductor layer 451 is formed by plating. In an example process, a seed layer is deposited over the surface of carrier 471, by sputtering, chemical vapor deposition (CVD) or other deposition step. A photoresist layer is deposited over the seed layer, exposed, developed and cured to form a pattern to be plated. Electroless or electroplating is performed using the exposed portions of the seed layer to start the plating, forming a pattern according to patterns in the photoresist layer.

At step 405, the plating process continues. A second photoresist layer is deposited, exposed, and developed to pattern the first connection level conductor layer 452. By leaving the first photoresist layer in place, the second photoresist layer is used without an intervening photoresist strip and clean step, to simplify processing. The first trace level conductor layer 451 can be used as a seed layer for the second plating operation, to further simplify processing, as another sputter process is not performed at this step.

At step 407, a first dielectric deposition is performed. The first trace level conductor layer 451 and the first connection level conductor layer 452 are covered in a dielectric material 461. In an example a thermoplastic material is used, in a particular example ABF is used; in alternative examples ABS or ASA can be used, or a thermoset epoxy resin mold compound can be used; resins, epoxies, or plastics can be used. In an example dielectric deposition process using ABF, a roll film form of ABF is used. The ABF is laminated over the trace conductor level 451 and the connection conductor level 453, and in a thermal process at an elevated temperature, the ABF softens and conforms to the layers to fill the spaces with dielectric, without voids. The dielectric layer 461 can then be cured to harden the material for successive processes.

At step 409, a grinding operation is performed on the surface of the dielectric 461 that exposes a surface of the connection level conductor layer 452 and provides conductive surfaces for mounting devices, or for use in additional plating operations. If the multilayer package substrate is complete at this step, the method ends at step 410, where a de-carrier operation removes the carrier 471 from the dielectric material 461, leaving the first trace level conductor layer

451 and the first connection level conductor layer 452 in a dielectric material 461, providing a multilayer package substrate.

In examples where additional trace level conductor layers and additional connection level conductor layers are needed, the method continues, leaving step 409 and transitioning to step 411 in FIG. 4B. The multilayer package substrate is now on carrier 471 with first trace level conductor layer 451 and connection level conductor layer 452 in dielectric 461, At step 411, a second trace level conductor layer 453 is formed by plating using the same processes as described above with respect to step 405. An additional seed layer for the additional plating operation is deposited and a photoresist layer is deposited and patterned, and the plating operation forms the second trace level conductor layer 453 over the dielectric 461, with portions of the second trace level conductor layer 453 electrically connected to the first connection level conductor layer 452.

At step 413, a second connection level conductor layer 454 is formed using an additional plating step on the second trace level conductor layer 453. The second connection level conductor layer 454 can be plated using the second trace level conductor layer 453 as a seed layer, and without the need for removing the preceding photoresist layer, simplifying the process.

At step 415, a second molding operation is performed to cover the second trace level conductor layer 453 and the second connection level conductor layer 454 in a layer of dielectric 463. The multilayer package substrate at this stage has a first trace level conductor layer 451, a first connection level conductor layer 452, a second trace level conductor layer 453, and a second connection level conductor layer 454, portions of the layers are electrically connected together to form conductive paths through the dielectric layers 461 and 463.

At step 417, the dielectric 463 is mechanically ground in a grinding process or is chemically etched to expose a surface of the second connection level conductor layer 454. At step 419 the example method ends by removing the carrier 471, leaving a multilayer package substrate including the trace level conductor layers 451, 453, and connection level conductor layers 452 and 454 in dielectric layers 461, 463. The steps of FIGS. 4A-4B can be repeated to form multilayer package substrates for use with the arrangements having more layers, by performing plating of a trace level conductor layer, plating of a connection level conductor layer, adding a dielectric material covering the layers, and grinding, repeatedly.

Useful sizes for an example of the multilayer package substrate could be from two to seven millimeters wide by two to seven millimeters long, for example. The size of the multilayer package substrate can be varied depending on the size and number of semiconductor devices mounted, as well as the size and number of slotted waveguide antennas and their dimensions, so that the area of the device side surface is sufficient for mounting the semiconductor devices and for forming the slotted waveguide antennas spaced from the semiconductor devices.

As signal frequencies increase, the wavelengths of the signals become smaller and become compatible with microelectronic package sizes, for example millimeter wave signals between 30 GHz and 300 GHz have wavelengths of between 10 and 1 millimeters. The arrangements take advantage of these wavelengths to form integral slotted waveguide antennas sized compatibly for microelectronic device packages. As the transmit and receive frequencies increase and the signal wavelengths correspondingly decrease, the size of the antennas may also decrease, and the useful sizes of the multilayer package substrate may also decrease. The arrangements are useful in implementing antennas with millimeter wave frequencies, radar frequencies, and 5G standard frequencies, for example. Future developments in communications may use higher frequency signals, with correspondingly smaller wavelengths, allowing the integral slotted waveguide antennas of the arrangements to be smaller still.

Figure 5A:
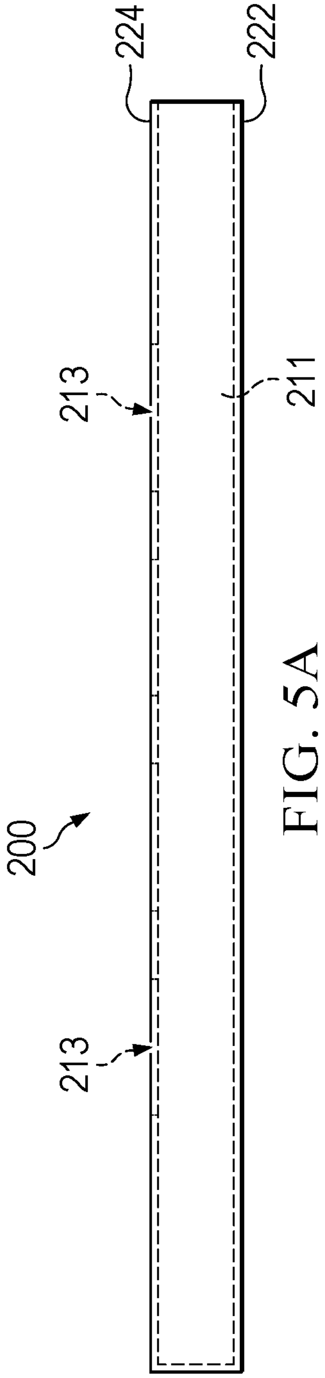
FIGS. 5A, 5B and 5C illustrate, in a side view, a cross-sectional view, and a projection view, respectively, an example slotted waveguide antenna for use with the arrangements.
Figure 5B:
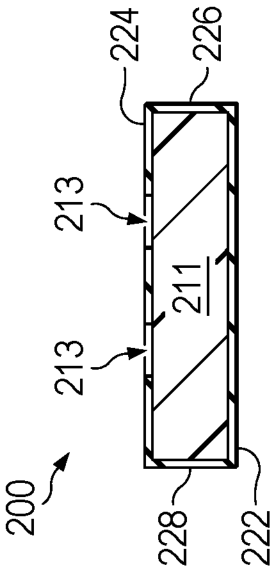
Figure 5C:
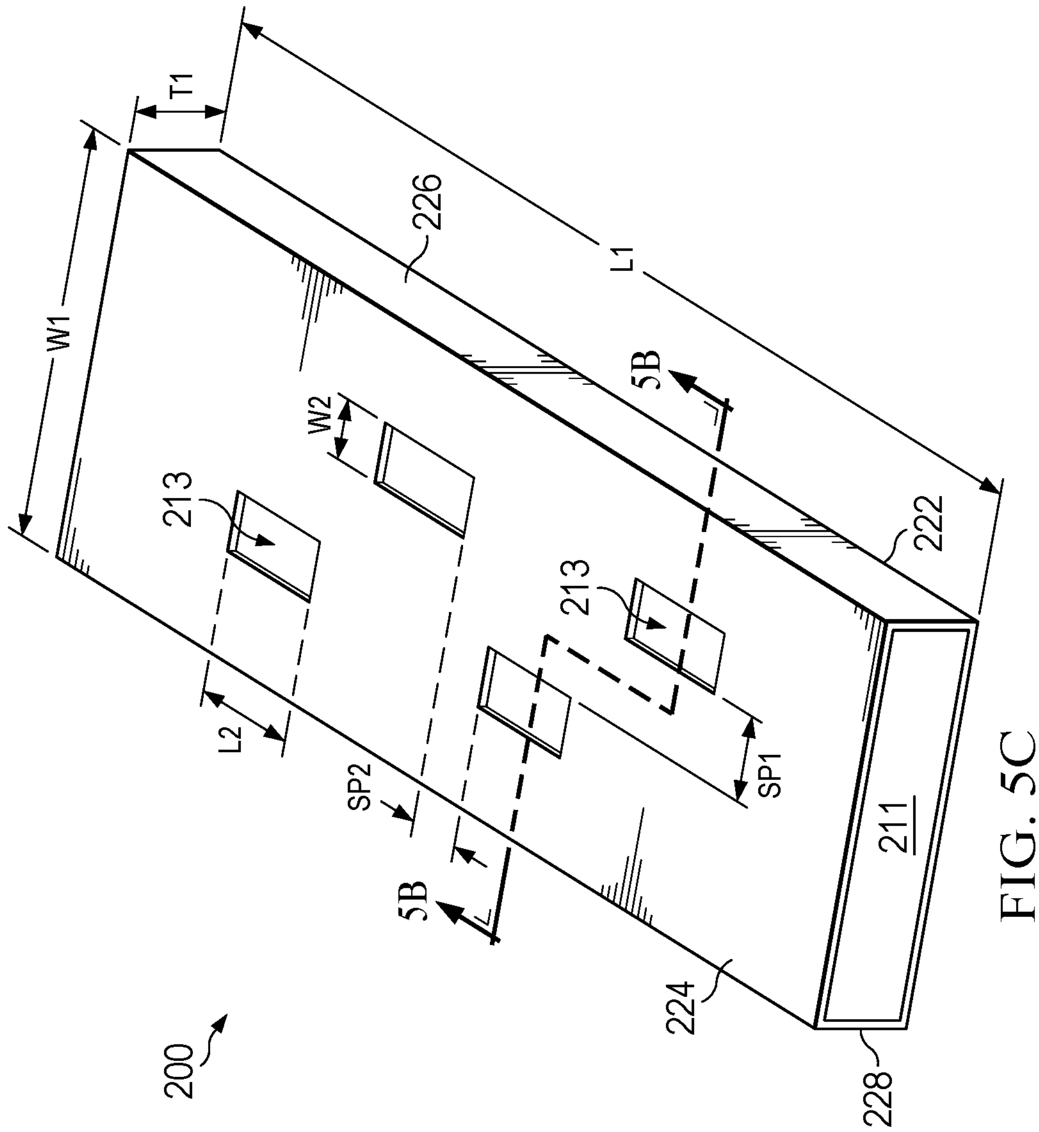

FIGS. 5A-5C illustrate, in a side view, a cross section, and a projection view, respectively, the details of an example slotted waveguide antenna that can be formed in a multilayer package substrate and used in the arrangements. In FIG. 5A, the slotted waveguide antenna 200 is shown with conductors arranged to form a rectangular waveguide with a top surface 224, a bottom surface 222, and dielectric 211. The slots 213 are shown formed as opening in the top surface 224. The slotted waveguide antenna 200 is shown in FIG. 5B in a cross sectional view, the vertical conductors 226, 228 form sides connecting the top surface 224, and the bottom surface 222. Dielectric 211 fills the slotted waveguide antenna and one slot 213 is shown in the cross section.

FIG. 5C illustrates a particular example of a slotted waveguide antenna 200 that can be used in an arrangement. In the example, the slotted waveguide antenna 200 is arranged for radiating signals in the WR5 frequency band, between 140 GHz and 220 GHz in frequency. In FIG. 5C, the example slotted waveguide antenna 200 has an overall width W1, which can be in the range of 830 microns, and a length L1 in the range 2800 microns. The slots 213 can be designed to act as an array that acts like a single antenna by splitting the fields in the propagation path (see FIG. 5B). The example slotted waveguide antenna 200 is designed to operate in the $TE_{10}$ propagation mode. The example slotted waveguide antenna 200 has a thickness T1 of about 200 microns. The thickness T1 can be chosen to increase constructive interference at the radiation point, so that energy moving downwards in the waveguide is reflected in phase with energy moving upwards, by making the thickness T1 approximately one quarter wavelength ($\lambda/4$). In FIG. 5C, the slots 213 have a length L2 of about 300 microns, and a width W2 of about 125 microns. The spacing distances between the slots are also shown, in the example slotted waveguide antenna 200, the spacing distance SP2 is about 150 microns and the spacing distance SP1 is about 175 microns. The design of the slots to act as a small antenna array is described by Elliott and Kurtz. Changing dimensions in the slotted waveguide, the slot dimensions and spacings, and the number of the slots can change the frequency the antenna is resonant at, and antenna designs for various frequencies can be created. The example slotted waveguide antenna 200 is tuned for frequencies between 207-211 GHz and has the highest radiation efficiency at about 208-210 GHz.

Figure 6A:
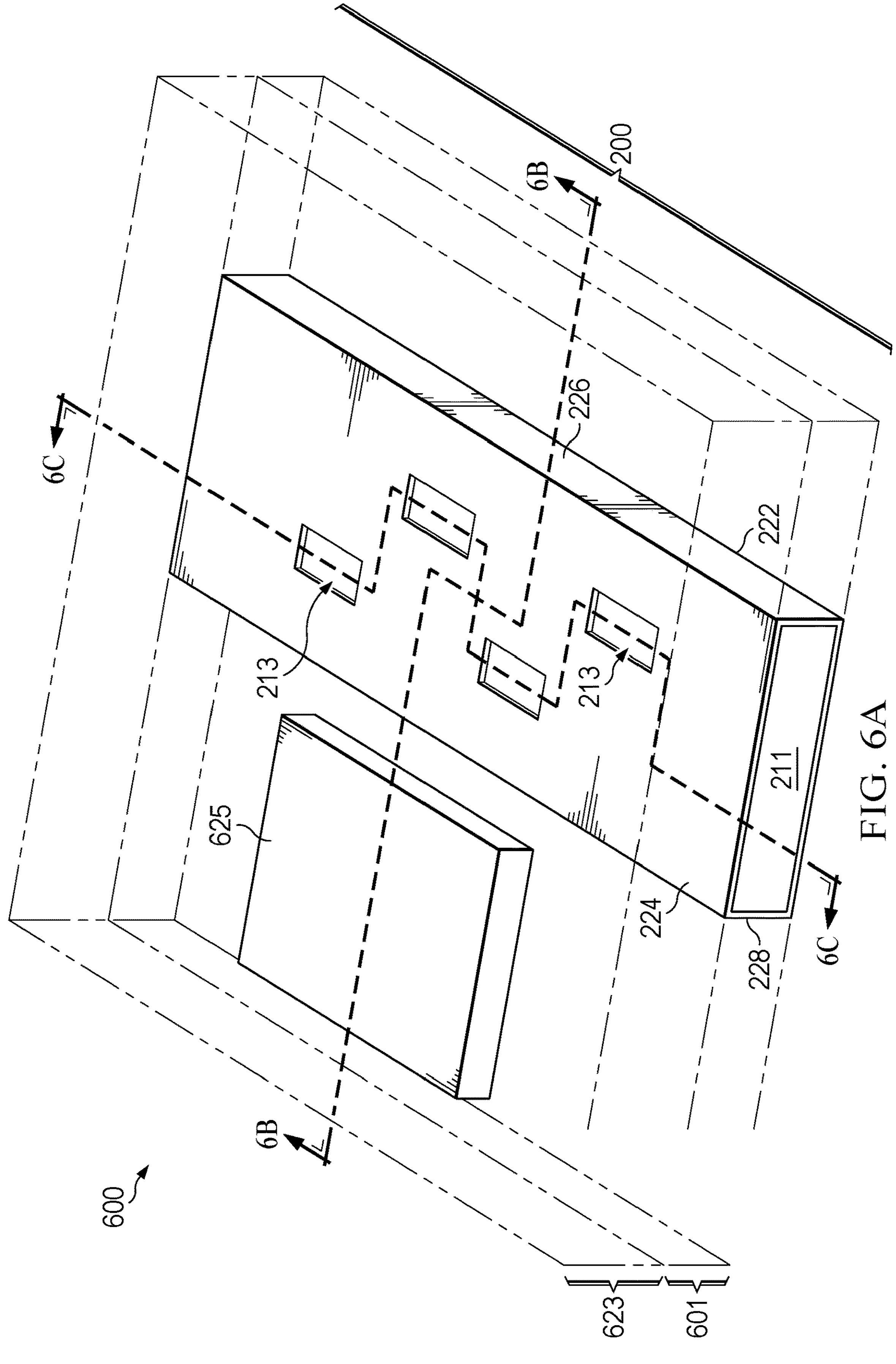
FIGS. 6A-6C illustrate, in projection views, a cross-sectional view, and a projection including a graph of electric field strength, an arrangement for a microelectronic device package and integral slotted waveguide antenna.
Figure 6B:
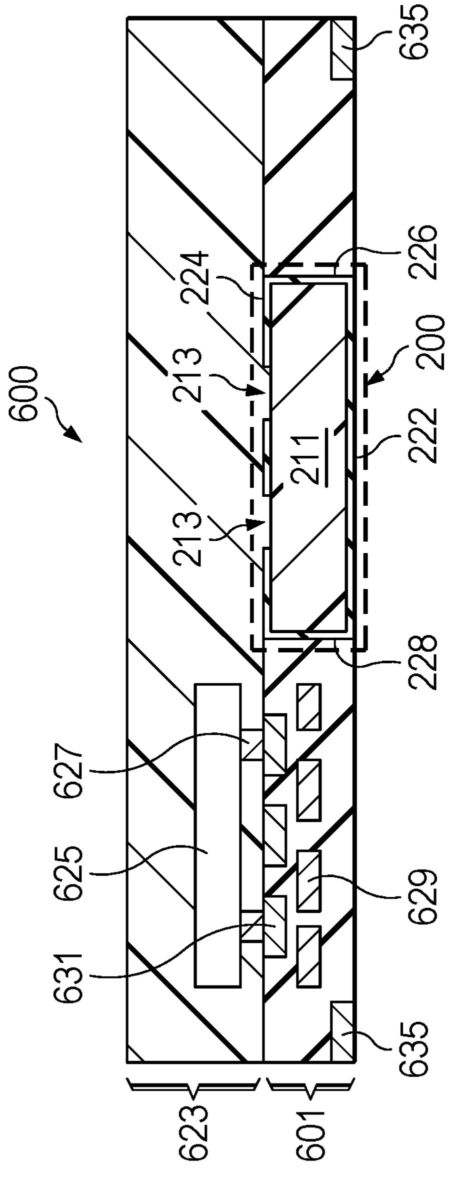
Figure 6C:
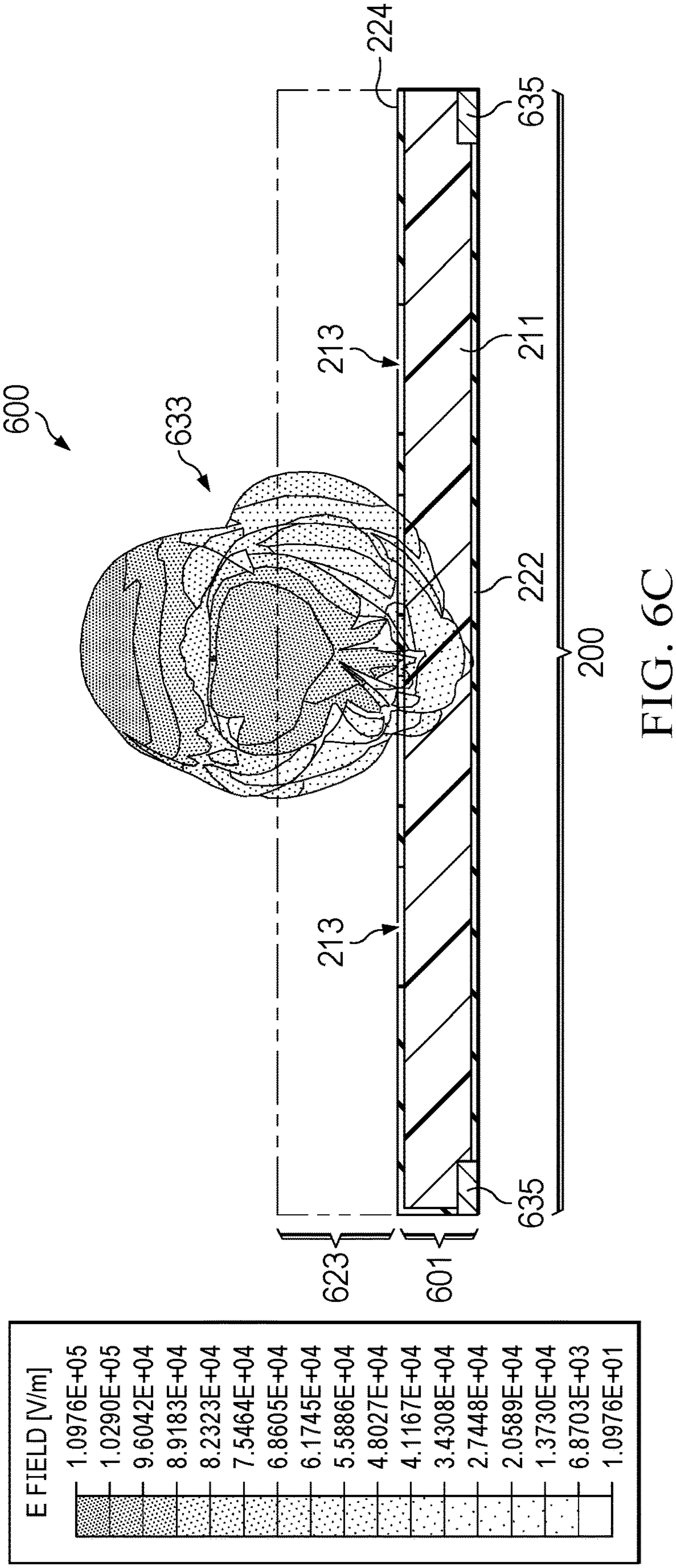

FIGS. 6A-6C illustrate, in a projection view, and two cross-sectional views respectively, an example arrangement for a microelectronic device package with an integral slotted wavelength antenna. In FIG. 6A, a microelectronic device package 600 is shown with the slotted wavelength antenna 200 formed in multilayer package substrate 601. The multilayer package substrate includes trace level conductors 222 and 224 forming the bottom and top surfaces, respectively, of the slotted waveguide antenna 200. Connection level conductors 226, 228 formed in the multilayer package substrate 601, and portions of trace level conductors, form the opposing sides of the slotted waveguide antenna 200. A semiconductor die 625 is shown mounted on the multilayer package substrate 601. Flip-chip mounting can be used for the semiconductor die 625, for example. A mold compound 623 covers the multilayer package substrate 601 and the semiconductor die 625, with slots 213 formed in the upper surface 224. The slots 213 are arranged to radiate or receive RF signals as an antenna, the signal radiating through the mold compound 623.

FIG. 6B is a cross sectional view of the microelectronic device package 600 shown in FIG. 6A. In FIG. 6B, the package substrate 601 is shown with trace level conductors 629, 631 formed in trace level conductor layers beneath the semiconductor die 625. The trace level conductors 629, 631 are formed in the manufacturing of package substrate 601 which, as described above, is formed in an additive build-up process using a series of plating steps to form plated trace level conductor layers and using a dielectric such as Ajinomoto build-up film (ABF), ASA, ABS, electronic mold compound, or another dielectric such as a resin, epoxy or plastic. Electroless plating or electroplating can be used to form the trace level conductor layers. Connection level conductor layers connecting the trace level conductor layers 629, 631 are not shown in FIG. 6B, for simplicity of illustration. Terminals 635 are formed in the manufacture of the package substrate 601 as trace level conductors that are partially exposed from the multilayer package substrate 601. Terminals 635 are arranged for use in solder mounting the microelectronic device package 600.

Multilayer package substrate 601 includes the slotted waveguide antenna 200 which is formed in the build-up manufacturing process described above and illustrated in FIGS. 4A-4B. Slotted waveguide antenna 200 includes the rectangular waveguide formed of conductor materials to form sides 226, 228 in the trace level conductor layers and connection level conductor layers, and a bottom conductor layer 222, with a top conductor layer 224, completing the rectangular waveguide of the slotted waveguide antenna 200 Slots 213 are shown in the top conductor layer 224. The dielectric 211 filling the waveguide is the dielectric used to form package substate 601, for example, ABF or another thermoplastic or thermoset dielectric material.

The semiconductor die 625 is flip chip mounted to the device side surface of the package substrate 601 using solder on conductive post connects 627. The conductive post connects 627 can be, for example, copper pillar bumps or solder bumps. Electronic mold compound 623, or another dielectric layer, covers the semiconductor die 625 and the device side surface of the package substrate 601. The slotted waveguide antenna 200 is covered by mold compound 623. The example microelectronic device package 600 is a quad flat no-lead (QFN) package. The semiconductor die 625 and the slotted waveguide antenna 200 can be arranged in other package types, including wire bonded leaded packages such as dual inline package (DIP) and small outline integrated circuit (SOIC) packages. The semiconductor die 625 could be mounted on the board side of the package substrate 601 in a "possum" style package. In an alternative arrangement (not shown), a protective cover is used instead of the mold compound 623.

The semiconductor die 625 can be a transceiver that is coupled to the slotted waveguide antenna 200 by a coplanar waveguide (CPW), a grounded coplanar waveguide (GCPW), a conductor backed coplanar waveguide (CBCPW), a microstrip, or by a transition device (not shown for simplicity of illustration) that is formed in or mounted on the multilayer package substrate 601. In an example a CBCPW is formed in the multilayer package substrate 601 and couples the semiconductor die 625 to the slotted waveguide antenna 200. When the a coplanar waveguide such as a CPW, GCPW or CBCPW is formed in the multilayer package substrate 601, the semiconductor die 625 can feed the slotted waveguide antenna 200 directly, no transition circuit is needed.

In an alternative arrangement, the slotted waveguide antenna 200 is formed in a multilayer package substrate 601 and is packaged as a microelectronic device package, while the semiconductor die is packaged as a second integrated circuit in a second semiconductor device package and is coupled to the slotted waveguide antenna. This alternative arrangement simplifies the microelectronic device package 600, however in implementation it requires additional board area to mount and couple the two packaged devices using traces on a system board.

FIG. 6C illustrates, in a side view, the microelectronic device package 600 of FIG. 6A, and includes a realized gain plot 633 illustrating a simulation result for a WR5 radio frequency signal. In FIG. 6C, the microelectronic device package 600 is shown with a package substrate 601, with terminals 635 on a board side surface. The slotted waveguide antenna 200 with slots 213 in the upper surface is shown with a realized gain plot 633 for a target frequency of about 210 GHz, a WR5 range frequency. As can be seen from the scale in FIG. 6C, the radiated signal has high gain, and a narrow beamwidth. The slotted waveguide antenna 200 can be tuned using different slot sizes. Simulations can be performed to determine the slot sizes, positions and resulting gain for different antenna designs. The radiated signal gain in FIG. 6C is shown in Volts/meter (V/m) according to the scale. The radiated signal directed normal to the device side surface of the package substrate 601.

The gain obtained by use of the slotted waveguide antenna as shown in FIG. 6C can be increased further by the use of multiple slotted waveguide antennas arranged in an array to act as a single antenna. In an example arrangement illustrated below, four slotted waveguide antennas, which can be a first slotted waveguide antenna such as 200 in FIG. 6A, and additional replicated slotted waveguide antennas, are formed in a multilayer package substrate and used to radiate RF signals. In other alternative arrangements, still more slotted waveguide antennas can be used in an array, for example seven or more, to further increase the antenna gain.

Figure 7A:
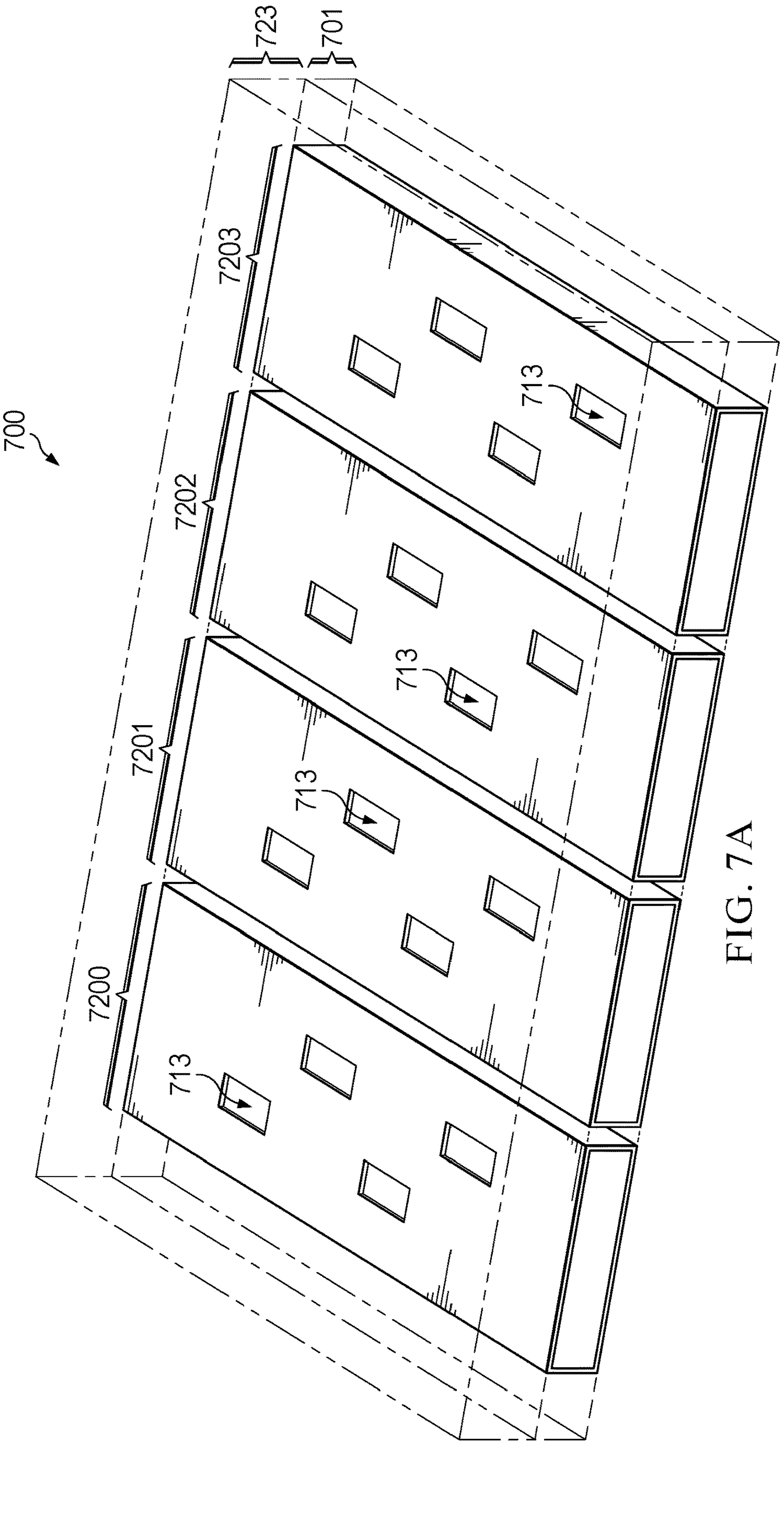
FIG. 7A illustrates, in a projection view, an alternative arrangement for an array of slotted waveguide antennas integral to a package substrate.
Figure 7B:
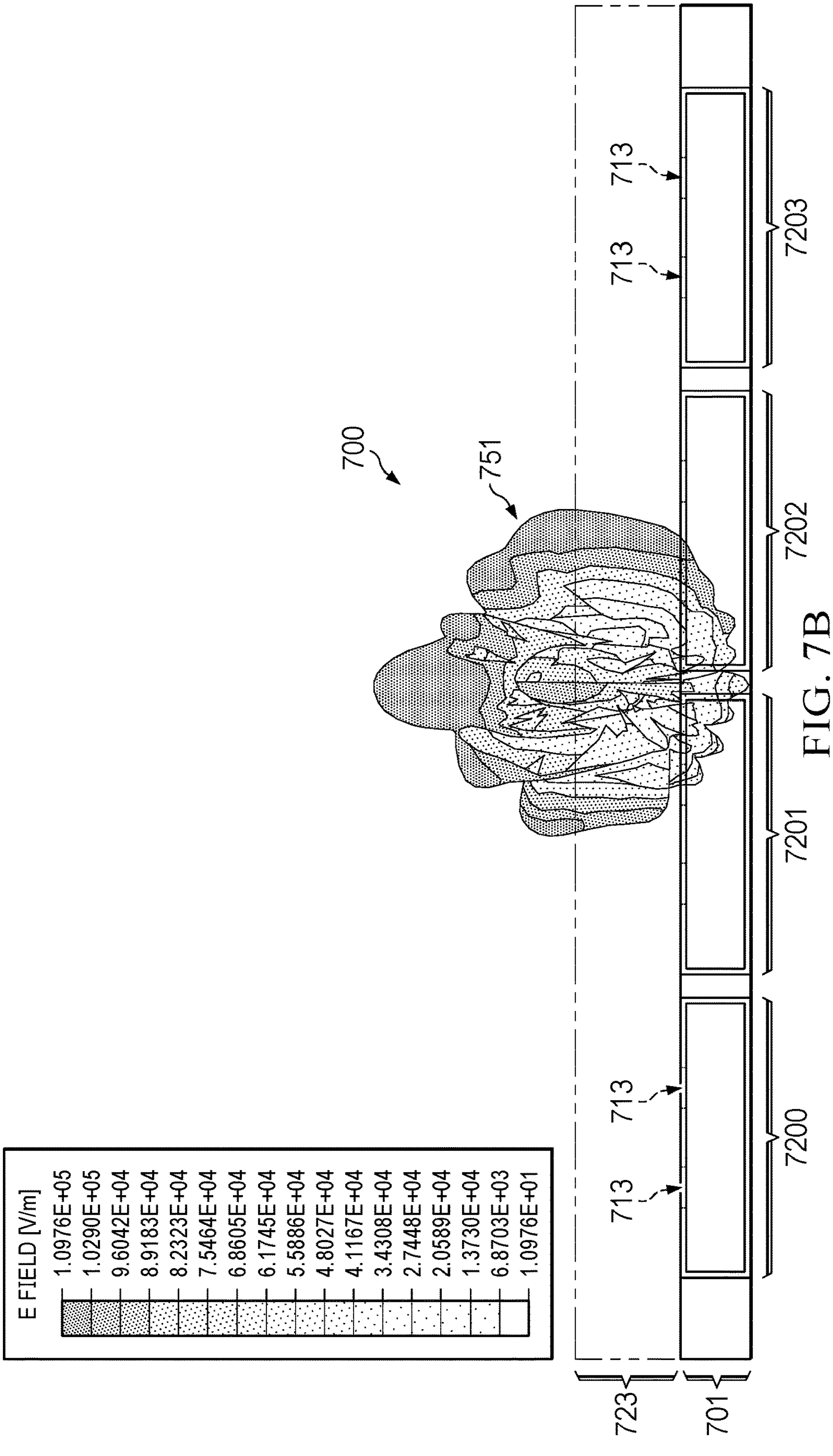
FIGS. 7B-7C illustrate a side view and an end view of the arrangement, respectively, including electric field graphs.
Figure 7C:
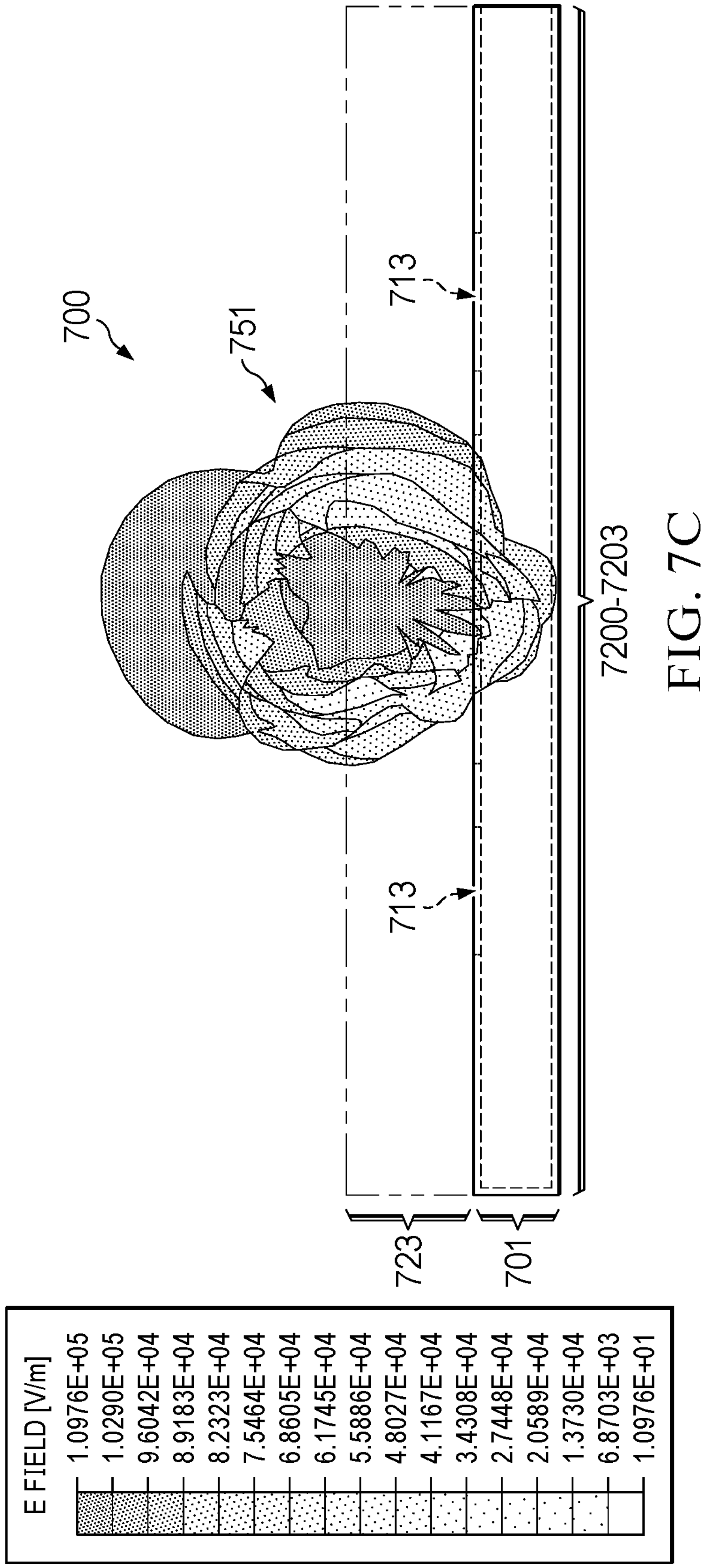

FIGS. 7A-7C illustrate the example arrangement with four slotted waveguide antennas arranged to radiate a signal. In FIG. 7A, a microelectronic device package 700 includes slotted waveguide antennas 7200-7203, each can be implemented using the slotted waveguide antenna 200 of FIGS. 6A-6C, for example. The slots 713 correspond to slots 213 in FIG. 6A, for example, but are used in each of the four slotted waveguide antennas. In additional examples, more, or fewer, numbers of slotted waveguide antennas can be used. For example, seven slotted waveguide antennas can be used.

In FIG. 7A, a multilayer package substrate 701 has the slotted waveguide antennas 7200, 7201, 7202, and 7203 formed within it. The package substrate 701 can have a semiconductor die (not shown in FIG. 7A, for simplicity of illustration) mounted on the upper surface (see semiconductor die 625 in FIG. 6A, for example), and terminals (not shown, see terminals 635 in FIG. 6C, for example) for mounting the microelectronic device package 700 can be formed in the multilayer package substrate 701 (see terminals 635 in FIG. 6C, for example). The semiconductor die can be mounted on the multilayer package substrate in an area spaced from the slotted waveguide antennas 7200-7203 and can be coupled to feed the array of slotted waveguide antennas.

The microelectronic device package 700 will be larger than the microelectronic device package 600, for example, to allow space for the additional slotted waveguide antennas. The semiconductor die or dies can include circuitry configured as a receiver, transmitter or transceiver of RF signals. In an example, the slotted waveguide antennas 7200-7203 are arranged to radiate RF signals at a frequency range of 207-211 GHz, in the WR5 frequency range.

In FIG. 7B, the microelectronic device package 700 is shown in an end view looking into the slotted waveguide antennas, each slotted waveguide antenna 7200-7203 is similar to the slotted waveguide antenna 200 of FIG. 6A, for example, and is formed using the additive build-up process described above used to form package substrate 701. A mold compound 723 covers the package substrate 701 on a device side surface; in alternative arrangements a protective cover or lid can be used (not shown). Slots 713 in the slotted waveguide antennas 7200-7203 are formed in the upper conductor of the slotted waveguide antennas and are similar to slots 213 in antenna 200 (see FIG. 6A, for example). In the end view of FIG. 7B, a radiation pattern 751 from a simulation is shown imposed on the microelectronic device package 700. The realized gain is greater than that of FIG. 6C, for example approximately twice the gain is obtained in a simulation, increasing from about 6 dB, to about 12 dB, as shown on the realized gain plots of FIGS. 8B-8C, described below.

FIG. 7C illustrates in a side view the microelectronic device package 700 including the slotted waveguide antennas 7200-7203, with slots 713, and mold compound 723 covering the package substrate 701. The radiation pattern 751, obtained from simulations, indicates a greater realized gain than the similar radiation pattern shown in the realized gain plot 633 in FIG. 6C, showing that by use of an array of slotted waveguide antennas, very high gain can be obtained, a greater gain than by use of a single slotted waveguide antenna. One or more semiconductor dies (not shown for clarity of illustration) can be mounted on the package substrate 701, on the device side surface, and be coupled to the array of slotted waveguide antennas 7200-7203 using a coplanar waveguide, a grounded coplanar waveguide, a conductor backed coplanar waveguide, or a microstrip line formed in the package substrate 701. In an example arrangement, a CBCPW is used, and no transition device is needed to feed the array of slotted waveguide antennas 7200-7203 with an RF signal from a semiconductor die transceiver mounted on the package substrate 701.

Figure 8A:
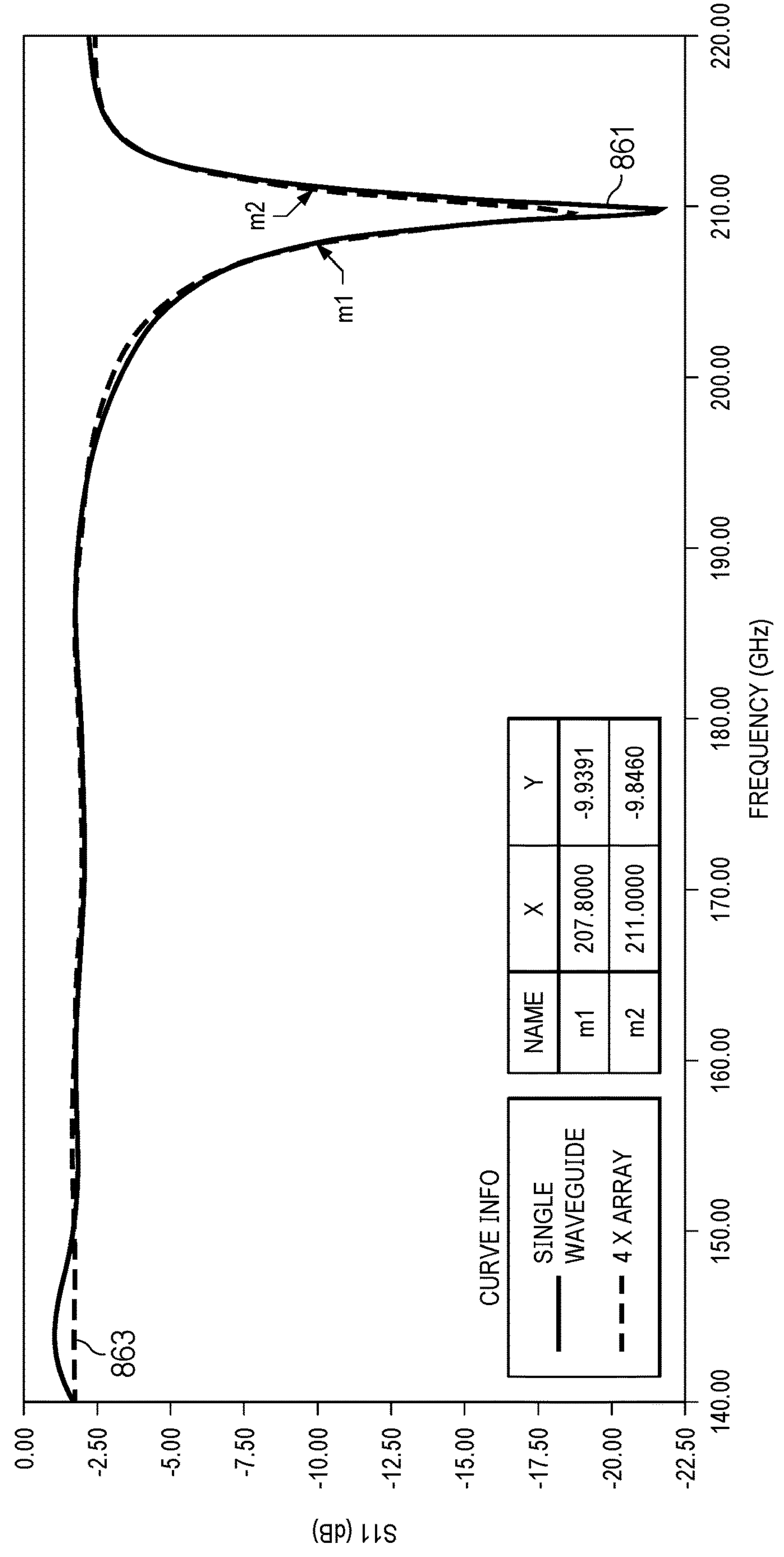
FIG. 8A illustrates, for two arrangements, a graph showing return loss data for simulation results obtained for a GHz signal at frequencies of interest.

FIG. 8A illustrates, in an antenna return loss plot, the frequency response obtained for two example arrangements, one using the single slotted waveguide antenna such as 200 in FIG. 6A, and another example using an array of four slotted waveguide antennas arranged side by side such as 7200-7203 in FIG. 7A. In FIG. 8A, an S 11 parameter or return loss plot 800 is shown, with simulation results plotted in two curves, curve 861 is for the single slotted waveguide antenna case, and curve 863 is for the array of four slotted waveguide antennas. The −10 dB return loss points labeled m1, m2 are shown marked on both curves indicating a bandwidth of between 207.8 GHz (m1) and 211 GHz (m2). As shown in graph 800 in FIG. 8A, the maximum return loss frequency is about 209 GHz-210 GHz, the target frequency was 210 GHz for the arrangements.

Figure 8B:
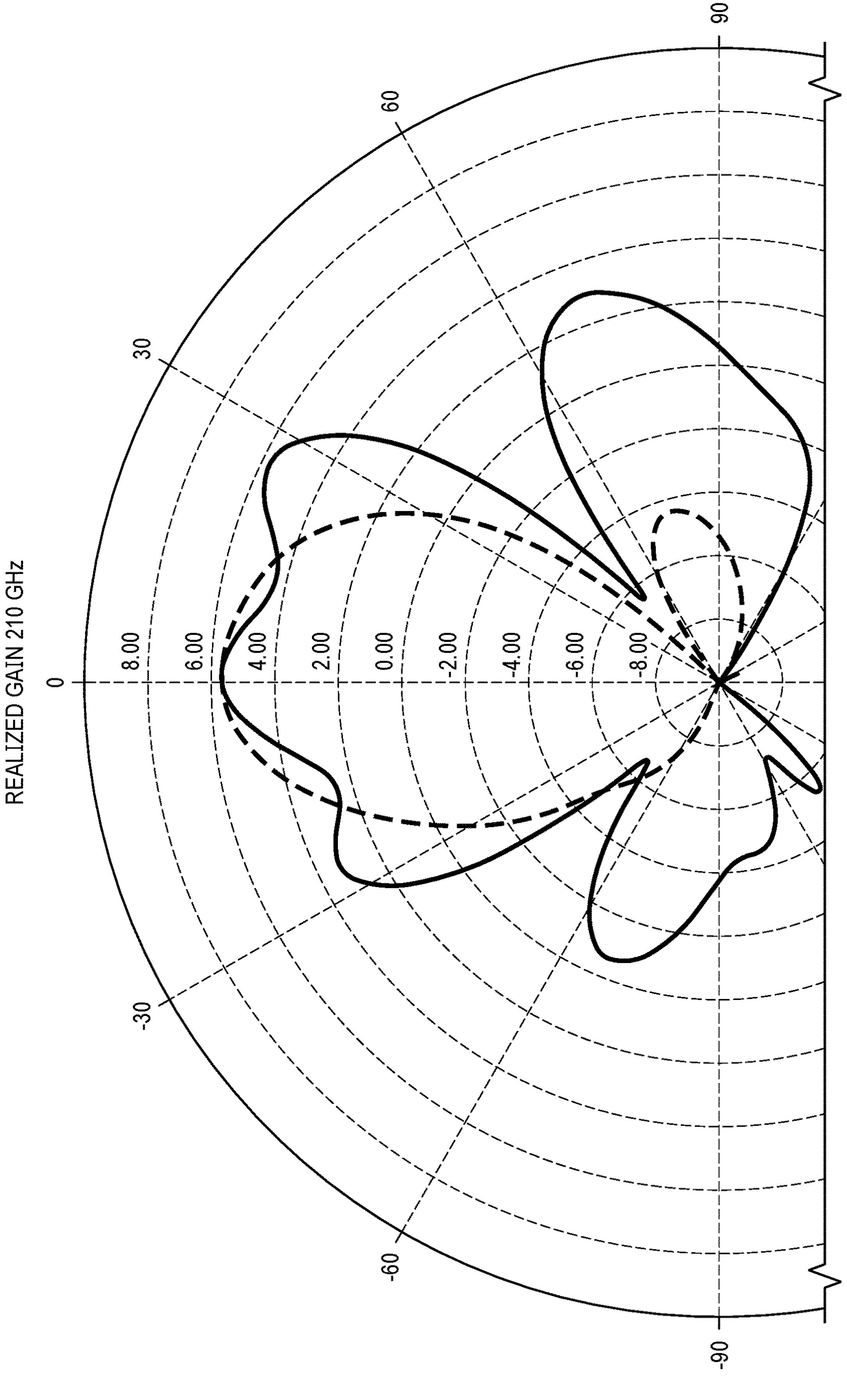
FIGS. 8B and 8C are plots illustrating the realized signal gain, for example arrangements.

FIG. 8B illustrates the realized gain for a single slotted waveguide antenna such as 200 in FIG. 6A in an example arrangement. The realized gain plot 871 illustrates simulation results obtained at a target frequency of 210 GHz. The realized gain at this frequency was about 6 dB, and the realized gain pattern shows a narrow beam as desired for transceiving radio signals.

Figure 8C:
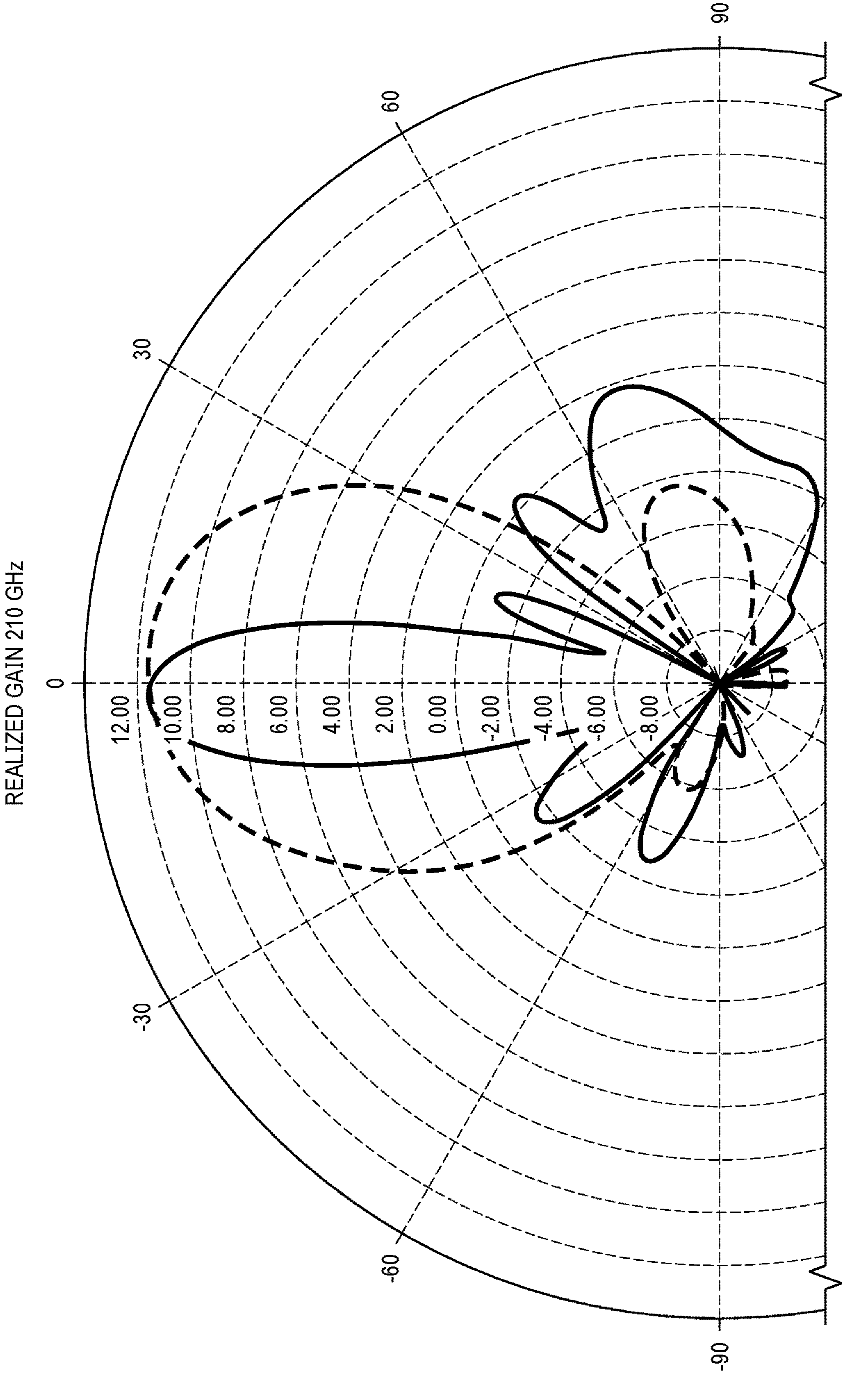

FIG. 8C illustrates in a realized gain plot 873 the gain obtained from an example arrangement using four antenna array of slotted waveguide antennas such as 700 in FIG. 7A. As shown in FIG. 8C, the realized gain at the target frequency of 210 GHz is approximately 12 dB, and the pattern indicates a narrow beam as is desired for transceiving radio signals.

In simulations a −10 dB bandwidth of 4 GHz+ is observed within the WR5 frequency band for both a single slotted waveguide antennas and an array of four replicated slotted waveguide antennas. For the single slotted waveguide arrangement, a maximum realized gain of 6.99 dBi at a frequency of 209 GHz was shown in simulation, with radiation efficiency of approximately 50 percent at that frequency, while for the four-antenna array arrangement, a maximum realized gain of 12.27 dBi and 55.4 percent radiation efficiency was observed for a frequency of 208 GHz. At the target frequency of 210 GHz, the single slotted waveguide antenna has a peak realized gain of above 6 dBi at a radiation efficiency of 43 percent, while the example four slotted waveguide antenna array has a peak realized gain of 11.5 dBi at a radiation efficiency of 42.4 percent. The arrangements provide efficient slotted waveguide antennas formed integral to a multilayer package substrate, without the need for discrete antenna laminates or other components and provide a mounting surface for a semiconductor die coupled to the slotted waveguide antennas, to provide a cost effective and high-performance microelectronic device package for RF devices.

The frequency response of the slotted waveguide antennas, both single and array arrangements, can be tuned using the dimensions of the slotted waveguide, the number, placement, and dimensions of the slots, and the number of antennas. Increasing the number of antennas in an array of similar slotted waveguide antennas can increase the realized gain from a microelectronic device package, as described above.

Figure 9:
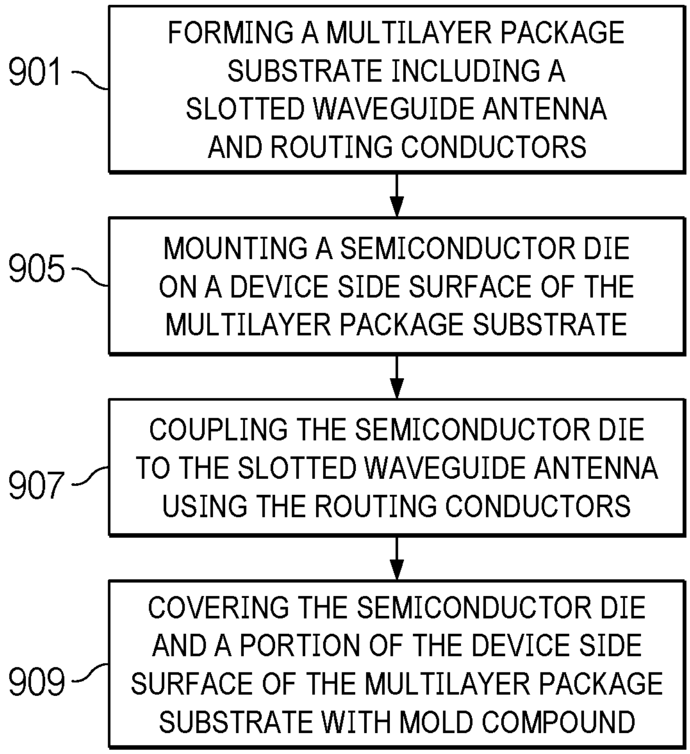
FIG. 9 illustrates, in a flow diagram, selected steps of a method for forming the arrangements.

FIG. 9 illustrates, in a flow diagram, steps for forming an arrangement. The method begins at step 901 by forming a multilayer package substrate including a slotted waveguide antenna and routing conductors. (See, for example, slotted waveguide antenna 200 in FIG. 5A, 5B, the multilayer package substrate 601 in FIG. 6B, with the routing conductors 629, 631.)

At step 905, a semiconductor die is mounted on a device side surface of the multilayer package substrate, (see semiconductor die 625 in FIG. 6B, for example).

At step 907, the semiconductor die is coupled to the slotted waveguide antenna by the routing conductors (see FIG. 6B, routing conductors 629, 631).

At step 909, the semiconductor die and a portion of the device side of the multilayer package substrate is covered with mold compound (see, for example, FIG. 6B, showing mold compound 623 over package substrate 601 in the microelectronic device package 600).

Figure 10:
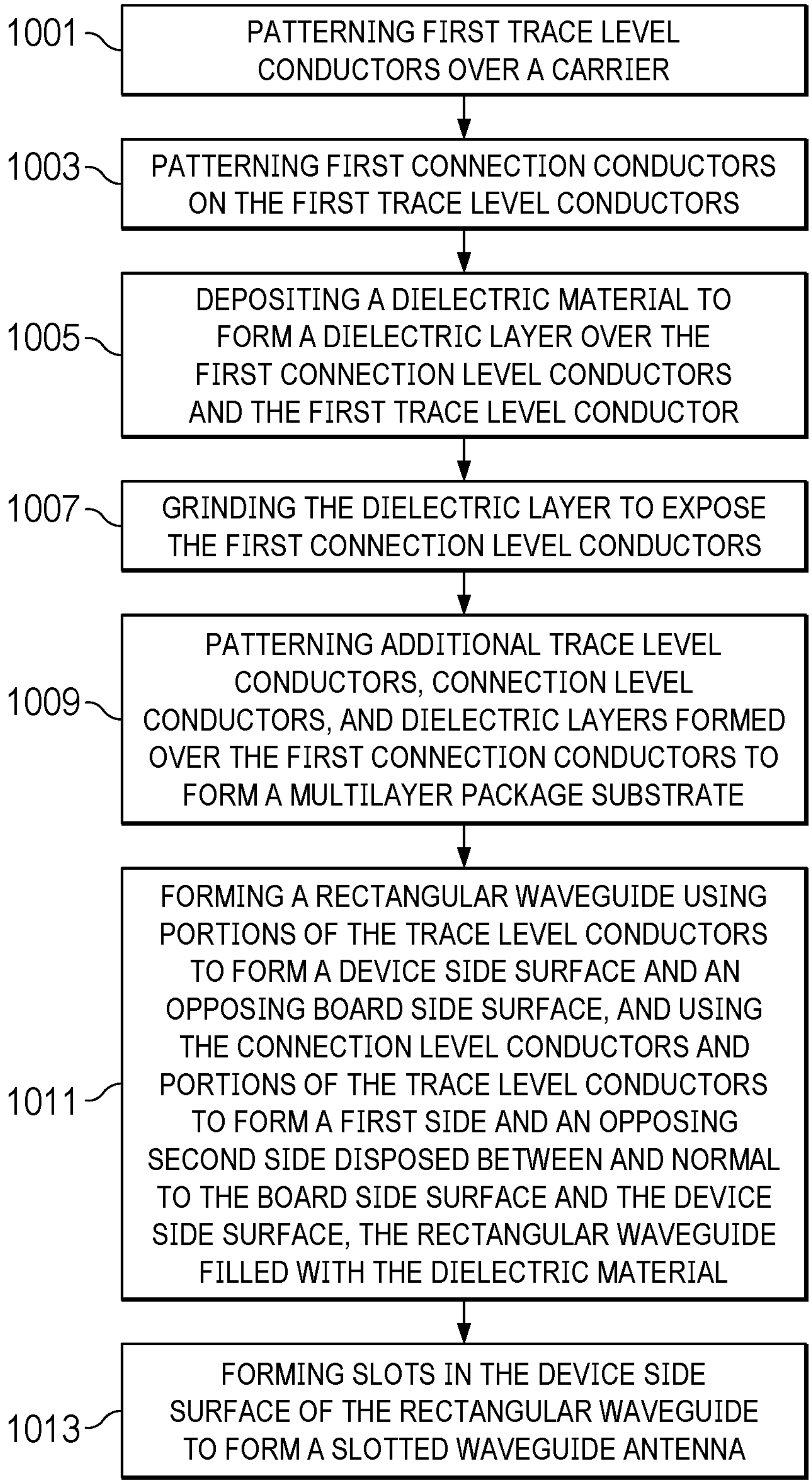
FIG. 10 illustrates, in an additional flow diagram, selected steps of a method for forming the arrangements.

FIG. 10 illustrates, in another flow diagram, the steps used to form the multilayer package substrate including the slotted waveguide antenna. At step 1001, the first trace level conductors are patterned over a carrier (see, for example, trace level conductors 451 in FIG. 4A, step 403). At step 1003, the first connection level conductors are patterned onto the trace level conductors (see, for example. the first connection level conductors 452 in FIG. 4A, step 405). At step 1005, a dielectric material is deposited to form a dielectric layer over the first connection level conductors and the first trace level conductors. (See, for example, the dielectric layer 461 in FIG. 4A, at step 407). At step 1007, the method continues by grinding the dielectric layer to expose the first level connection conductors (see, for example, step 409 in FIG. 4A). At step 1009, additional trace level conductors and connection level conductors are patterned over the first connection level conductors to form a multilayer package substrate. (See, FIG. 4B, steps 411-419).

At step 1011, the method continues and forms a rectangular waveguide using portions of the trace level conductors to form a device side surface and an opposing board side surface, and using the connection level conductors and portions of the trace level conductors to form a first side and an opposing second side disposed between and normal to the board side surface and the device side surface, the rectangular waveguide filled with the dielectric material (see, for example, the rectangular waveguide of slotted waveguide antenna 200 in FIG. 6A). At step 1013, slots are formed in the rectangular waveguide to form a slotted waveguide antenna. (See, for example, slots 213 in slotted waveguide antenna 200 in FIG. 6A).

The use of the arrangements provides a microelectronic device package including a multilayer package substrate with an integral slotted waveguide antenna (or antennas) and can include a semiconductor die mounted to the multilayer package substrate. Existing materials and assembly tools are used to form the arrangements, and the arrangements are low in cost when compared to solutions using a discrete laminate substrate to form and carry the antennas. The arrangements are formed using existing methods, materials, and tooling for making the devices and are cost effective.

Modifications are possible in the described arrangements, and other alternative arrangements are possible within the scope of the claims.

What is claimed is:

1. A microelectronic device package, comprising:

a multilayer package substrate comprising a slotted waveguide antenna and routing conductors, the multilayer package substrate having a device side surface and an opposing board side surface;

a semiconductor die mounted to the device side surface of the multilayer package substrate and coupled to the slotted waveguide antenna by the routing conductors; and mold compound covering the semiconductor die, and a portion of the multilayer package substrate.

2. The microelectronic device package of claim 1, wherein the semiconductor die comprises a radio frequency transceiver device.

3. The microelectronic device package of claim 1, wherein the slotted waveguide antenna comprises a rectangular waveguide having a first side, a second side opposite the first side, a board side surface normal to the first side and to the second side and parallel to the board side surface of the multilayer package substrate, and a device side surface opposite the board side surface and parallel to the device side surface of the multilayer package substrate;

dielectric material formed within the rectangular waveguide; and slots formed in the device side surface of the rectangular waveguide configured to radiate radio frequency energy.

4. The microelectronic device package of claim 3, wherein the multilayer package substrate comprises trace level conductor layers spaced by the dielectric material between the trace level conductor layers, and connection level conductors between the trace level conductor layers and extending through the dielectric material.

5. The microelectronic device package of claim 4, wherein the dielectric material comprises Ajinomoto build-up film (ABF).

6. The microelectronic device package of claim 4, wherein the dielectric material comprises Ajinomoto build-up film (ABF), acrylonitrile butadiene styrene (ABS), acrylonitrile styrene acrylate (ASA), or resin epoxy.

7. The microelectronic device package of claim 4, wherein the first side, the second side, the board side surface, and the device side surface of the rectangular waveguide are formed of the trace level conductor layers and the connection level conductors of the multilayer package substrate.

8. The microelectronic device package of claim 4, wherein the trace level conductor layers in the multilayer package substrate are of copper, gold, aluminum, silver, or an alloy thereof.

9. The microelectronic device package of claim 3, wherein the dielectric material is Ajinomoto build-up film (ABF).

10. The microelectronic device package of claim 3, wherein the dielectric material is Ajinomoto build-up film (ABF), acrylonitrile butadiene styrene (ABS), acrylonitrile styrene acrylate (ASA), or epoxy resin.

11. The microelectronic device package of claim 1, wherein the slotted waveguide antenna is a first slotted waveguide antenna, and further comprising additional slotted waveguide antennas formed in the multilayer package substrate.

12. The microelectronic device package of claim 1, wherein the slotted waveguide antenna is configured to radiate at a radio frequency between 30 GHz and 300 GHz.

13. The microelectronic device package of claim 12, wherein the slotted waveguide antenna is configured to radiate at a radio frequency between 207 GHz and 211 GHz.

14. The microelectronic device package of claim 13, wherein the slotted waveguide antenna is configured to radiate at a radio frequency of approximately 210 GHz.

15. The microelectronic device package of claim 1, wherein the semiconductor die is flip chip mounted to the device side surface of the multilayer package substrate, the semiconductor die having conductive post connects extending from bond pads on the semiconductor die and extending to distal ends away from the semiconductor die, and having solder bumps on the distal ends of the conductive post connects, the solder bumps forming bonds to the multilayer package substrate.

16. The microelectronic device package of claim 1, further comprising terminals formed on the board side surface of the multilayer package substrate, the terminals forming electrical connections for the microelectronic device package including the semiconductor die and the slotted waveguide antenna.

17. The microelectronic device package of claim 1, wherein the microelectronic device package further comprises a quad flat no-lead (QFN) microelectronic device package.

18. An apparatus, comprising:

a multilayer package substrate comprising an array of slotted waveguide antennas positioned side by side and routing conductors, the multilayer package substrate having a device side surface and an opposite board side surface;

a semiconductor die mounted to the device side surface of the multilayer package substrate and coupled to the array of slotted waveguide antennas by the routing conductors; and a cover covering the semiconductor die, and a portion of the multilayer package substrate.

19. The apparatus of claim 18, wherein one of the array of slotted waveguide antennas comprises:

a rectangular waveguide having a first side, a second side opposite the first side, a board side surface normal to the first side and to the second side and parallel to the board side surface of the multilayer package substrate, and a device side surface opposite the board side surface and parallel to the device side surface of the multilayer package substrate;

dielectric material within the rectangular waveguide; and slots formed in the device side surface of the rectangular waveguide to form the one of the array of slotted waveguide antennas.

20. A method, comprising:

forming a multilayer package substrate comprising a slotted waveguide antenna and routing conductors in trace level conductors of the multilayer package substrate;

mounting a semiconductor die over a device side surface of the multilayer package substrate, the semiconductor die coupled to the slotted waveguide antenna by the routing conductors; and covering the semiconductor die and a portion of the multilayer package substrate with mold compound to form a microelectronic device package.

21. The method of claim 20, wherein forming the multilayer package substrate comprising the slotted waveguide antenna comprises:

patterning first trace level conductors over a carrier;

patterning first connection level conductors over the first trace level conductors;

depositing a dielectric layer over the first connection level conductors and the first trace level conductors;

grinding the dielectric layer to expose the first connection level conductors;

patterning additional trace level conductors, additional connection level conductors, and additional dielectric layers formed over the first connection level conductors to form the multilayer package substrate;

forming a rectangular waveguide in the multilayer package substrate using portions of the trace level conductors to form a board side surface and a device side surface opposite the board side surface, using the connection level conductors to form a first side and a second opposing side between the board side surface and the device side surface and normal to the board side surface, the rectangular waveguide filled with the dielectric layers; and forming slots in the device side surface of the rectangular waveguide configured to radiate radio frequency energy.

22. The method of claim 21, wherein the dielectric layers comprise Ajinomoto build-up film (ABF), acrylonitrile butadiene styrene (ABS), acrylonitrile styrene acrylate (ASA), or epoxy resin.

23. The method of claim 21, wherein patterning the first trace level conductors and the first connection level conductors comprises plating copper or an alloy.

24. The method of claim 20, wherein the slotted waveguide antenna is a first slotted waveguide antenna, and further comprising forming additional slotted waveguide antennas in the multilayer package substrate.

25. The method of claim 20, wherein the slotted waveguide antenna is tuned to a frequency of between 140 GHz and 220 GHz.

26. The method of claim 20, further comprising forming a coplanar waveguide or a microstrip using the routing conductors, and coupling the semiconductor die to the slotted waveguide antenna using the coplanar waveguide or the microstrip.

* * * * *